US012778015B2

(12) United States Patent
Cho

(10) Patent No.: US 12,778,015 B2
(45) Date of Patent: Nov. 3, 2026

(54) METHOD FOR DETERMINING A FRUIT TO BE HARVESTED AND A DEVICE FOR HARVESTING A FRUIT

(71) Applicant: AGRICULTURAL CORPORATION IOCROPS INC., Pohang-si (KR)

(72) Inventor: Jin Hyung Cho, Seoul (KR)

(73) Assignee: AGRICULTURAL CORPORATION IOCROPS INC., Pohang-si (KR)

( * ) Notice: Subject to any disclaimer, the term of this patent is extended or adjusted under 35 U.S.C. 154(b) by 477 days.

(21) Appl. No.: 18/237,440

(22) Filed: Aug. 24, 2023

(65) Prior Publication Data

US 2023/0389474 A1 Dec. 7, 2023

Related U.S. Application Data

(63) Continuation of application No. PCT/KR2022/002775, filed on Feb. 25, 2022.

(30) Foreign Application Priority Data

Feb. 26, 2021 (KR) ........................ 10-2021-0026710

(51) Int. Cl.
*A01D 46/30* (2006.01)

(52) U.S. Cl.
CPC .................................... *A01D 46/30* (2013.01)

(58) Field of Classification Search
CPC .......... A01D 46/24; G06N 3/08; G06T 7/187; G06T 7/70; G06T 2207/20081; G06T 2207/20084
See application file for complete search history.

(56) References Cited

U.S. PATENT DOCUMENTS 7,765,780 B2 * 8/2010 Koselka ................. A01D 46/30 701/50
10,757,861 B2 * 9/2020 Robertson .......... G06Q 30/0283
(Continued)

FOREIGN PATENT DOCUMENTS

JP H06131444 A 5/1994
JP 4171806 B2 10/2008
(Continued)

OTHER PUBLICATIONS

Office Action on Korean Patent Application No. 10-2021-0026710 issued Apr. 20, 2021.
(Continued)

*Primary Examiner* — Akwasi M Sarpong
*Assistant Examiner* — Michael L Burleson
(74) *Attorney, Agent, or Firm* — Dinsmore & Shohl LLP; Yongsok Choi, Esq.

(57) ABSTRACT

An annotation method for acquiring a training data set for training a ripeness determination model for target fruits is provided. The annotation method includes the steps of: acquiring at least one image; extracting a characteristic area for the target fruits included in the at least one image; calculating a first parameter for a first color and a second parameter for a second color on the basis of a pixel value included in the characteristic area; and acquiring labeling data for the characteristic area on the basis of at least the first parameter and the second parameter.

12 Claims, 22 Drawing Sheets

1000

(56) References Cited

U.S. PATENT DOCUMENTS

| | | | | |
|---|---|---|---|---|
| 2010/0140938 | A1* | 6/2010 | Cook | F03D 7/047 290/44 |
| 2010/0260669 | A1* | 10/2010 | Yun | A61P 31/04 424/1.49 |
| 2011/0166913 | A1* | 7/2011 | Buchanan | G06Q 50/06 705/412 |
| 2013/0290130 | A1* | 10/2013 | Yuan | G01W 1/00 705/26.7 |
| 2014/0303814 | A1* | 10/2014 | Burema | A01C 21/005 901/1 |
| 2016/0259089 | A1* | 9/2016 | Mckinnon | G06Q 50/02 |
| 2018/0092304 | A1* | 4/2018 | Moore | B25J 9/0084 |
| 2018/0364746 | A1* | 12/2018 | Boisjoli | G05D 23/1932 |
| 2019/0227575 | A1* | 7/2019 | Maor | A01G 3/085 |
| 2019/0228477 | A1* | 7/2019 | Carter | G01W 1/10 |
| 2019/0392262 | A1 | 12/2019 | Dasari et al. | |
| 2020/0246839 | A1* | 8/2020 | Chi | B07C 5/36 |
| 2021/0000013 | A1* | 1/2021 | Robertson | B25J 15/0019 |
| 2021/0204490 | A1* | 7/2021 | Bartrom | A01G 9/042 |
| 2021/0319489 | A1* | 10/2021 | Lewis | G06Q 30/0633 |
| 2022/0078972 | A1* | 3/2022 | Faulring | B25J 15/0226 |
| 2022/0130036 | A1* | 4/2022 | Gatto | G06T 7/70 |
| 2022/0156670 | A1* | 5/2022 | Issrani | B62B 5/0096 |
| 2022/0164989 | A1* | 5/2022 | Knopf | G06V 20/68 |
| 2023/0169764 | A1* | 6/2023 | Yuan | G06V 10/774 382/110 |
| 2023/0389474 | A1* | 12/2023 | Cho | A01D 46/30 |
| 2025/0081892 | A1* | 3/2025 | Lu | B25J 9/1697 |

FOREIGN PATENT DOCUMENTS

| | | | |
|---|---|---|---|
| JP | 2017134585 | A | 8/2017 |
| JP | 2019187259 | A | 10/2019 |
| JP | 2019531228 | A | 10/2019 |
| JP | 2020012667 | A | 1/2020 |
| JP | 2020123319 | A | 8/2020 |
| KR | 1020090124335 | A | 12/2009 |
| KR | 101846301 | B1 | 4/2018 |
| KR | 1020190136774 | A | 12/2019 |
| WO | 2018087546 | A1 | 5/2018 |

OTHER PUBLICATIONS

Notice of Allowance on Korean Patent Application No. 10-2021-0026710 issued May 21, 2021.

International Search Report of PCT/KR2022/002775 dated May 16, 2022.

Written Opinion of PCT/KR2022/002775 dated May 16, 2022.

Notice of Allowance of KR Patent Application No. 10-2021-0067270 issued on Ocoter 7, 2024.

Office Action of KR Patent Application No. 10-2021-0067270 issued on Apr. 15, 2024.

* cited by examiner

1

| RIPENESS | LABELING DATA |
|---|---|
| RIPE | (1,0) |
| UNRIPE | (0,1) |

A

| RIPENESS | LABELING DATA |
|---|---|
| FIRST RIPENESS | 0 |
| SECOND RIPENESS | 1 |
| THIRD RIPENESS | 2 |

B

| SIZE | LABELING DATA |
|---|---|
| LARGE SIZE | (1,0) |
| SMALL SIZE | (0,1) |

A

| SIZE | LABELING DATA |
|---|---|
| FIRST SIZE | 0 |
| SECOND SIZE | 1 |
| THIRD SIZE | 2 |

B

| DISTANCE | LABELING DATA |
|---|---|
| ADJACENT DISTANCE | (1,0) |
| SPACED DISTANCE | (0,1) |

A

| DISTANCE | LABELING DATA |
|---|---|
| FIRST DISTANCE | 0 |
| SECOND DISTANCE | 1 |
| THIRD DISTANCE | 2 |

B

| COLUMN | LABELING DATA |
|---|---|
| ADJACENT COLUMN | (1,0) |
| SPACED COLUMN | (0,1) |

A

| COLUMN | LABELING DATA |
|---|---|
| FIRST COLUMN | 2 |
| SECOND COLUMN | 1 |
| THIRD COLUMN | 0 |

FIG. 12

| RIPENESS | LABELING DATA | OUTPUT VALUE |
|---|---|---|
| RIPE | (1,0) | 0.82 |
| UNRIPE | (0,1) | 0.18 |

130

140

| RIPENESS | LABELING DATA | OUTPUT VALUE |
|---|---|---|
| FIRST RIPENESS | 0 | 0.16 |
| SECOND RIPENESS | 1 | 0.14 |
| THIRD RIPENESS | 2 | 0.70 |

131

METHOD FOR DETERMINING A FRUIT TO BE HARVESTED AND A DEVICE FOR HARVESTING A FRUIT

CROSS-REFERENCE TO RELATED APPLICATIONS

This application is a continuation of International Application No. PCT/KR2022/002775 filed on Feb. 25, 2022, which claims priority to Korean Patent Application No. 10-2021-0026710 filed on Feb. 26, 2021, the entire contents of which are herein incorporated by reference.

TECHNICAL FIELD

The present disclosure relates to a device and a method for harvesting fruit. More particularly, the present disclosure relates to a device and a method for differentially harvesting target fruit to be harvested depending on a season using an artificial neural network trained with training data.

BACKGROUND ART

Automatic fruit harvesting technology is a technique that automatically determines target fruit to be harvested by a user using artificial intelligence.

Such automatic fruit harvesting technology may include a technique that automatically determines the target fruit to be harvested based on information on the state of the fruit. In this case, the information on the state of the fruit is obtained on the basis of an image.

On the other hand, while such information on the state of the fruit is required to involve a method of determining whether a farmer should harvest fruit, this method has been conventionally determined on the basis of the experience of most farmers and thus has limitations.

DISCLOSURE

Technical Problem

In providing a user with the determination of target fruit to be harvested, an objective of the present disclosure is to provide a device and a method for automatically determining target fruit to be harvested using an artificial neural network on the basis of an image.

In providing a user with the determination of target fruit to be harvested, another objective of the present disclosure is to provide a device and a method for determining target fruit to be harvested on the basis of fruit ripeness.

In providing a user with the determination of target fruit to be harvested, a further objective of the present disclosure is to provide a device and a method for determining different fruits to be harvested depending on a harvest season.

A further objective of the present disclosure is to provide a harvesting device and a method for detecting the location of fruit in a crop image and outputting fruit ripeness corresponding to the detected fruit.

A further objective of the present disclosure is to provide a device and a method for determining target fruit to be harvested in a crop image and harvesting the target fruit to be harvested according to a harvest order.

Technical Solution

A method for determining target fruit to be harvested, according to one embodiment, includes: inputting a crop image into an artificial neural network; outputting index data on the ripeness of each fruit included in the crop image using the artificial neural network; and outputting target fruit to be harvested on the basis of the index data. In the outputting of the target fruit to be harvested, in a first season, the fruit whose labeling data on the fruit ripeness, included in the index data, exceeds a first reference is output as the target fruit to be harvested. In addition, in a second season, the fruit whose labeling data on the fruit ripeness, included in the index data, exceeds a second reference is output as the target fruit to be harvested. In this case, the first and second references differ from each other.

A fruit harvesting device, according to one embodiment, includes: an image-obtaining unit configured to obtain a crop image in a greenhouse; a storage unit configured to store the crop image; a control unit configured to determine target fruit to be harvested on the basis of the crop image; and a mechanical unit configured to harvest the target fruit to be harvested. The control unit includes an artificial neural network. The artificial neural network outputs index data on fruit ripeness for a plurality of fruits included in the crop image, and differentially determines the target fruit to be harvested on the basis of the index data, depending on a harvest season.

A method for annotating for obtaining a training data set to train ripeness determination model for target fruit, according to embodiment, comprising: obtaining at least one of image, extracting a feature region for the target fruit included in the at least one of image, calculating a first parameter for a first color and a second parameter for a second color based on pixel values included in the feature region; and obtaining a labeling data for the feature region based on at least the first parameter and the second parameter, wherein the first color is related to a ripe state of the target fruit, wherein the second color is related to an unripe state of the target fruit, wherein the obtaining the labeling data comprising: comparing a first parameter with a first reference value, and comparing a second parameter with a second reference value, wherein the labeling data includes at least one of a labeling data corresponding to a first class, a second class and a third class.

Advantageous Effects

According to the present disclosure, a user can be automatically provided with target fruit to be harvested among fruit located in an image.

According to the present disclosure, the target fruit to be harvested, to be provided to a user, is based on ripeness, and the ripeness of the fruit can be calculated on the basis of the image.

According to the present disclosure, the target fruit to be harvested is determined differentially depending on a season when a user harvests the fruit, thereby maintaining the most optimal fruit ripeness during harvest, distribution, and sale.

According to the present disclosure, a user can be provided with a harvesting device configured to harvest fruit determined as the target fruit to be harvested according to a predetermined order.

DESCRIPTION OF DRAWINGS

FIG. 12 shows index data on fruit ripeness according to one embodiment;

DETAILED DESCRIPTION

Figure 1:
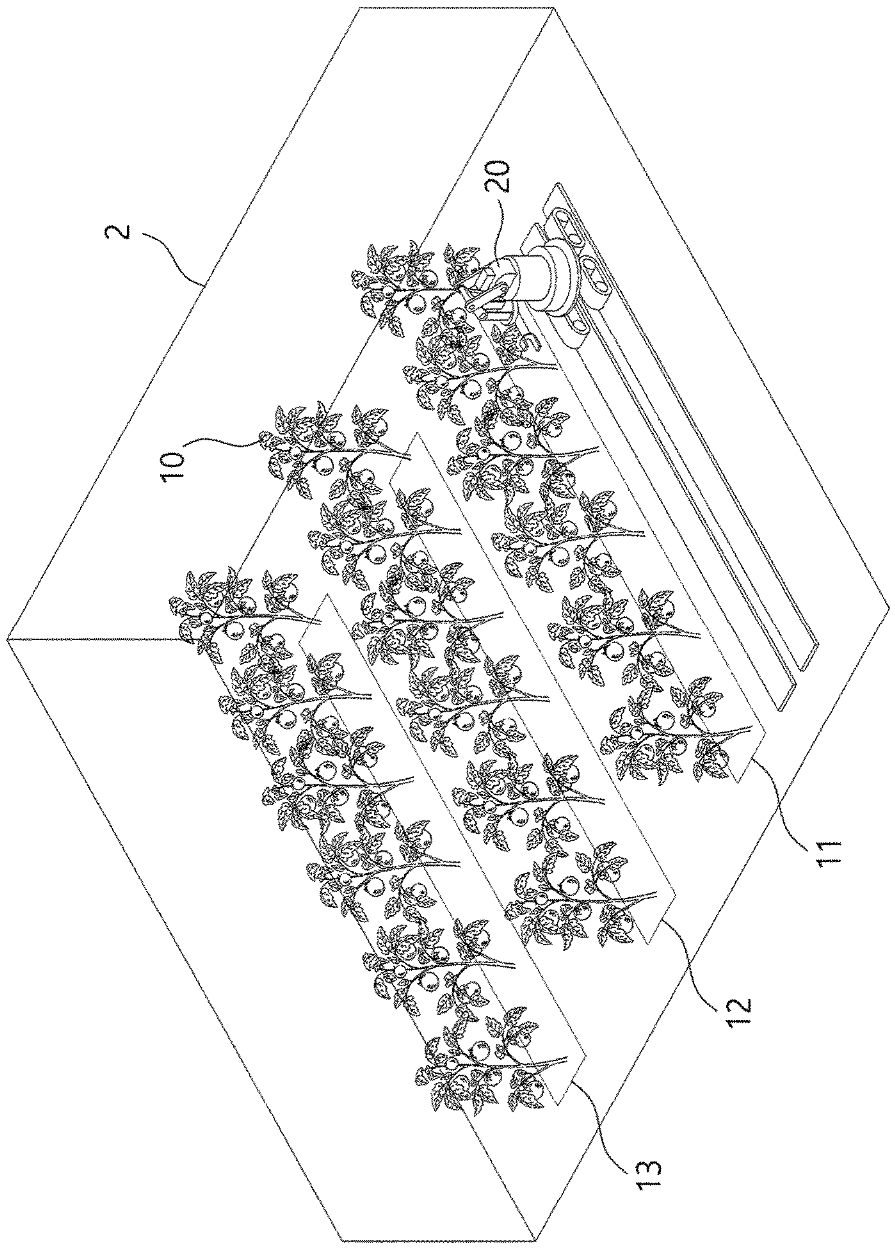
FIG. 1 is a schematic diagram of a greenhouse system according to one embodiment.

The foregoing objectives, features, and advantages of the present disclosure will become more apparent from the following detailed description taken in conjunction with the accompanying drawings. However, the present disclosure may be variously modified and have various embodiments. Hereinafter, specific embodiments will be illustrated in the drawings and described in detail.

In the drawings, the thickness of layers and regions is exaggerated for clarity. In addition, it will be understood that when an element or layer is referred to as being "on" or "above" another element or layer, it may be directly on the other element or layer, or intervening elements or layers may be present therebetween. Like reference numerals are used to identify like elements throughout the drawings. In the following description, like reference numerals are used to designate elements that have the same function within the same idea illustrated in the drawings of each embodiment.

In addition, in the following description of the present disclosure, detailed descriptions of known functions and components incorporated herein will be omitted when it may make the subject matter of the present disclosure unclear. Furthermore, numeral figures (for example, first, second, and the like) used during describing the specification are just identification symbols for distinguishing one element from another element.

In addition, the suffixes "module" and "unit" for the elements used in the following description are added or mixed considering only for the convenience of writing the specification but do not have meanings or functions that are distinguished from each other by themselves.

A method of determining target fruit to be harvested, according to one embodiment, includes: inputting a crop image into an artificial neural network; outputting index data related to a ripeness of each fruit included in the crop image using the artificial neural network; and outputting a target fruit to be harvested on the basis of the index data, wherein in the outputting of the target fruit to be harvested, in a first season, a fruit whose labeling data related to the ripeness included in the index data exceeds a first reference is output as the target fruit to be harvested, wherein in a second season, a fruit whose labeling data related to the ripeness included in the index data exceeds a second reference is output as the target fruit to be harvested, wherein the first and second references differ from each other.

In the outputting of the target fruit to be harvested, labeling data on the location of the target fruit to be harvested may also be output.

The second reference may be lower than the first reference.

When the labeling data related to the ripeness included in the index data is classified into data of a "ripe" or "unripe" class for the fruit ripeness, the first reference may be set as a first reference value based on a probability, and the second reference may be set as a second reference value based on probability.

When the labeling data related to the ripeness, included in the index data is classified as data of at least three or more classes according to the fruit ripeness, the first reference may be set as a first reference class according to the ripeness, and the second reference may be set as a second reference class according to the ripeness, wherein the second reference class may be lower than the first reference class.

The artificial neural network may be trained with training data, and the training data may include the location labeling data of the fruit included in the crop image.

The training data may include fruit size labeling data in which the fruit included in the crop image is classified into a plurality of size categories.

The training data may include fruit distance labeling data in which the fruit included in the crop image is classified into a plurality of distance categories. The fruit distance may indicate the distance between a camera and the fruit in the crop image.

The training data may include fruit column division labeling data in which the fruit located in an adjacent column and the fruit located in a spaced column in the crop image are divided.

The artificial neural network may output the index data on the fruit included in the crop image, and the index data may include at least one piece of data among the labeling data on the ripeness, size, distance, and column division of the fruit.

A fruit harvesting device, according to one embodiment, includes: an image-obtaining unit configured to obtain a crop image in a greenhouse; a storage unit configured to store the crop image; a control unit configured to determine target fruit to be harvested on the basis of the crop image;

and a mechanical unit configured to harvest the target fruit to be harvested. The control unit includes an artificial neural network. The artificial neural network outputs index data on fruit ripeness for a plurality of fruits included in the crop image, and differentially determines the target fruit to be harvested depending on a harvest season on the basis of the index data.

The image-obtaining unit may obtain first and second crop images. The artificial neural network may be trained on the basis of the first and second crop images, and may receive the image including the crops positioned in a plurality of columns to output an image including only crops positioned in the most adjacent column among the plurality of columns. The first crop image may include the crops located in the plurality of columns, and the second crop image may include only the crops positioned in the most adjacent column among the plurality of columns.

The second image may be an image in which crops other than the crops in the most adjacent column among the plurality of columns are removed by a blackout device.

The image-obtaining unit may obtain a plurality of crop images using a stereoscopic camera.

The image-obtaining unit may calculate the distance between the fruit and the harvesting device using a distance sensor.

The index data may include at least one piece of data among the labeling data on the ripeness, location, size, distance, and column division of the fruit for the plurality of fruits included in the crop image.

The control unit may determine a harvest order for the target fruit to be harvested, and the mechanical unit may harvest the fruit according to the harvest order.

The control unit may determine the harvest order on the basis of the index data.

The control unit may determine the harvest order with reference to fruit whose harvest is pending. When implementing the labeling data on the fruit location, included in the index data, as a bounding box, the fruit whose harvest is pending may be determined based on whether the bounding box is overlapped.

According to an embodiment, a method for annotating for obtaining a training data set to train ripeness determination model for target fruit comprises obtaining at least one of image; extracting a feature region for the target fruit included in the at least one of image; calculating a first parameter for a first color and a second parameter for a second color based on pixel values included in the feature region; and obtaining a labeling data for the feature region based on at least the first parameter and the second parameter; wherein the first color is related to a ripe state of the target fruit, wherein the second color is related to an unripe state of the target fruit, wherein the obtaining the labeling data comprising: comparing a first parameter with a first reference value; and comparing a second parameter with a second reference value; wherein the labeling data includes at least one of a labeling data corresponding to a first class, a second class and a third class.

Herein, a labeling data corresponding to the first class is obtained when the first parameter is greater than the first reference value, wherein a labeling data corresponding to the second class is obtained when the second parameter is greater than the second reference value, wherein a labeling data corresponding to the third class is obtained when the first parameter is less than the first reference value and the second parameter is less than the second reference value.

Herein, the first class is a class corresponding to the ripe state of the target fruit, wherein the second class is a class corresponding to the unripe state of the target fruit, wherein the third class is a class corresponding to a ripening state of the target fruit.

Herein, the comparison of the first parameter with the first reference value comprises: obtaining a labeling data corresponding to the first class when the first parameter is greater than the first reference value, and comparing the second parameter with the second reference value when the first parameter is less than the first reference value, wherein the comparison of the second parameter with the second reference value is comprising: obtaining a labeling data corresponding to the second class when the second parameter is greater than the second reference value, obtaining a labeling data corresponding to the third class when the second parameter is less than the second reference value.

Herein, the obtaining (calculating) the first parameter and the second parameter comprises: obtaining a number of pixels whose pixel value is included in a first range among pixels included in the feature region; obtaining a number of pixels whose pixel value is included in a second range among pixels included in the feature region; obtaining the first parameter based on the number of pixels whose pixel value is included in the first range among pixels included in the feature region obtaining the second parameter based on the number of pixels whose pixel value is included in the second range among pixels included in the feature region.

Herein, the first range is a range corresponding to the first color, wherein the second range is a range corresponding to the second color.

Herein, the obtaining (calculating) the first parameter and the second parameter further comprises: obtaining a number of pixels included in the feature region; wherein the first parameter is obtained based on the number of pixels whose pixel value is included in the first range among pixels included in the feature region and the number of pixels included in the feature region, wherein the second parameter is obtained based on the number of pixels whose pixel value is included in the second range among pixels included in the feature region and the number of pixels included in the feature region.

Hereinafter, specific embodiments of the present disclosure will be described in detail with reference to the drawings. However, the spirit of the present disclosure is not limited to the embodiments set forth herein. Rather, those skilled in the art may readily suggest other non-inventive inventions or embodiments, by adding, changing, deleting, or otherwise modifying other elements within the scope of the same spirit, which are also included within the scope of the present disclosure.

Hereinafter, a greenhouse system will be described with reference to the drawings.

FIG. 1 is a schematic diagram of the greenhouse system according to one embodiment.

Referring to FIG. 1, the greenhouse system 1, according to one embodiment, may include a greenhouse 2 and a harvesting device 20.

The greenhouse 2 may be a space in which crops grow. The greenhouse 2 may be a space with a built-in system capable of measuring basic information on the inside of the greenhouse, such as humidity and temperature inside the greenhouse for growing crops. In addition, the greenhouse 2 may be a space with a built-in system capable of controlling the inside of the greenhouse, based on the measured basic information on the side.

In the drawings and detailed description, although the greenhouse 2 has been illustrated for description, the greenhouse 2 may be a smart farm. In other words, the greenhouse system 1, according to one embodiment, may be applied not only to a closed space such as the greenhouse 2 but also to a space such as an open field.

Crops 10 may be plants capable of growing in the greenhouse 2. The crops 10 may be plants grown in soil or a plant grown using a nutrient solution. For example, the crops 10 may be tomatoes, paprikas, and the like.

The crops 10 may be arranged and grown in columns parallel to each other in the greenhouse 2. In other words, the crops 10 may be grown in the greenhouse by being divided according to columns.

The crops 10 may include a first-column crop 11, a second-column crop 12, and a third-column crop 13. The first-column crop 11 may be arranged and grown in a first column, the second-column crop 12 may be arranged and grown in a second column, and the third-column crop 13 may be arranged and grown in a third column.

The crops 10 may be grown at uniform intervals in each column. In addition, the crops may move at uniform intervals within the column as they grow. Furthermore, the crops 10 may move at uniform intervals within the column along an attractant line.

The harvesting device 20 may move within the greenhouse 2. The harvesting device 20 may move along between the columns where the crops are grown. The harvesting device 20 may move between the first-column crop 11 and the second-column crop 12 or between the second-column crop 12 and the third-column crop 13. The harvesting device 20 may move through rails installed between the first-column crop 11 and the second-column crop 12 or between the second-column crop 12 and the third-column crop 13. Alternatively, the harvesting device 20 may move while maintaining a predetermined distance at intervals between the crops, without rails. The harvesting device 20 may move while maintaining a constant speed.

The harvesting device 20 may obtain crop images including fruit in the greenhouse 2. The harvesting device 20 may obtain crop images while moving within the greenhouse 2. The harvesting device 20 may obtain crop images including fruit while moving between the first-column crop 11 and the second-column crop 12 and between the second-column crop 12 and the third-column crop 13. The harvesting device 20 may obtain crop images while maintaining a constant speed or may obtain crop images at a fixed location.

The harvesting device 20 may obtain information on fruit included in the crop image on the basis of the crop image. The information on the fruit may include at least one piece of information among information on the location, ripeness, size, distance, and column of the fruit.

The harvesting device 20 may determine the target fruit to be harvested on the basis of the fruit information. The harvesting device 20 may determine the target fruit to be harvested on the basis of the ripeness information on the fruit. Furthermore, the harvesting device 20 may determine different fruits to be harvested for each season on the basis of the ripeness information on the fruit.

The harvesting device 20 may determine the target fruit to be harvested and determine a harvest order for the target fruit to be harvested. The harvesting device 20 may harvest the target fruit to be harvested on the basis of the harvest order.

The harvesting device 20 may receive and store harvested fruit. The harvesting device 20 may transport the harvested fruit. Hereinafter, the harvesting device 20 will be described in detail.

In addition, the greenhouse system 1 may further include a server (not shown).

In this case, the server may obtain at least one piece of information on the greenhouse 2.

For example, the server may obtain at least one piece of information among a variety of environmental information on the greenhouse 2, such as temperature information, humidity information, and the like on the greenhouse 2, but is not limited thereto.

In this case, the information, such as the temperature information, humidity information, and the like on the greenhouse 2, may be obtained using a temperature sensor, humidity sensor, temperature and humidity sensor, and the like, located in the greenhouse 2, but is not limited thereto.

In addition, for example, the server may obtain at least one piece of information among a variety of information on the management of the crops 10, such as water supply data for the crops located in the greenhouse 2, but is not limited thereto.

In this case, the information, such as the water supply data for the crops 10, may be obtained using a watering sensor located in the greenhouse 2, but is not limited thereto.

In addition, for example, the server may obtain at least one piece of information among a variety of information on the state of the crops 10, such as an image of the crops 10 located in the greenhouse 2, but is not limited thereto.

In this case, the information, such as the image of the crops 10, may be obtained using an image-obtaining device located in the greenhouse 2 or an image-obtaining device located in the harvesting device 20, but is not limited thereto.

In addition, the server may transmit at least one piece of information on the greenhouse 2.

In this case, the at least one piece of information may include feedback information on the environment of the greenhouse 2.

For example, the server may transmit command information for increasing the humidity of the greenhouse 2, but is not limited thereto.

In addition, for example, the server may transmit a guide message for guiding the humidity of the greenhouse 2 to be increased, but is not limited thereto.

In addition, for example, the server may transmit command information for reducing the humidity of the greenhouse 2, but is not limited thereto.

In addition, for example, the server may transmit a guide message for guiding the humidity of the greenhouse 2 to be reduced, but is not limited thereto.

In addition, for example, the server may transmit command information for increasing the temperature of the greenhouse 2, but is not limited thereto.

In addition, for example, the server may transmit a guide message for guiding the temperature of the greenhouse 2 to be increased, but is not limited thereto.

In addition, for example, the server may transmit command information for reducing the temperature of the greenhouse 2, but is not limited thereto.

In addition, for example, the server may transmit a guide message for guiding the temperature of the greenhouse 2 to be reduced, but is not limited thereto In addition, for example, the server may transmit information on the predicted light amount for the greenhouse 2, but is not limited thereto.

In addition, for example, the server may transmit command information on light control on the basis of the information on the predicted light amount for the greenhouse 2, but is not limited thereto.

In addition, for example, the server may transmit a guide message for guiding light control on the basis of the information on the predicted light amount for the greenhouse 2, but is not limited thereto.

In addition, the at least one piece of information may include information on the management of the crops 10 located in the greenhouse 2.

For example, the server may transmit command information for the water supply of the crops 10, but is not limited thereto.

In addition, for example, the server may transmit a guide message for guiding the water supply of the crops 10, but is not limited thereto.

In addition, for example, the server may transmit command information for the thinning of at least one fruit of the crops 10, but is not limited thereto.

In addition, for example, the server may transmit a guide message for guiding the thinning of at least one fruit of the crops 10, but is not limited thereto.

In addition, for example, the server may transmit command information for the setting of at least one fruit of the crops 10, but is not limited thereto.

In addition, for example, the server may transmit a guide message for guiding the setting of at least one fruit of the crops 10, but is not limited thereto.

In addition, the at least one piece of information may include information on the reference of the greenhouse system 1.

For example, the server may transmit information on the reference for determining whether to set at least one fruit of the crops 10, but is not limited thereto.

In addition, for example, the server may transmit information on a version of a ripeness classification model for classifying at least one fruit of the crops 10 according to ripeness, but is not limited thereto.

Figure 2:
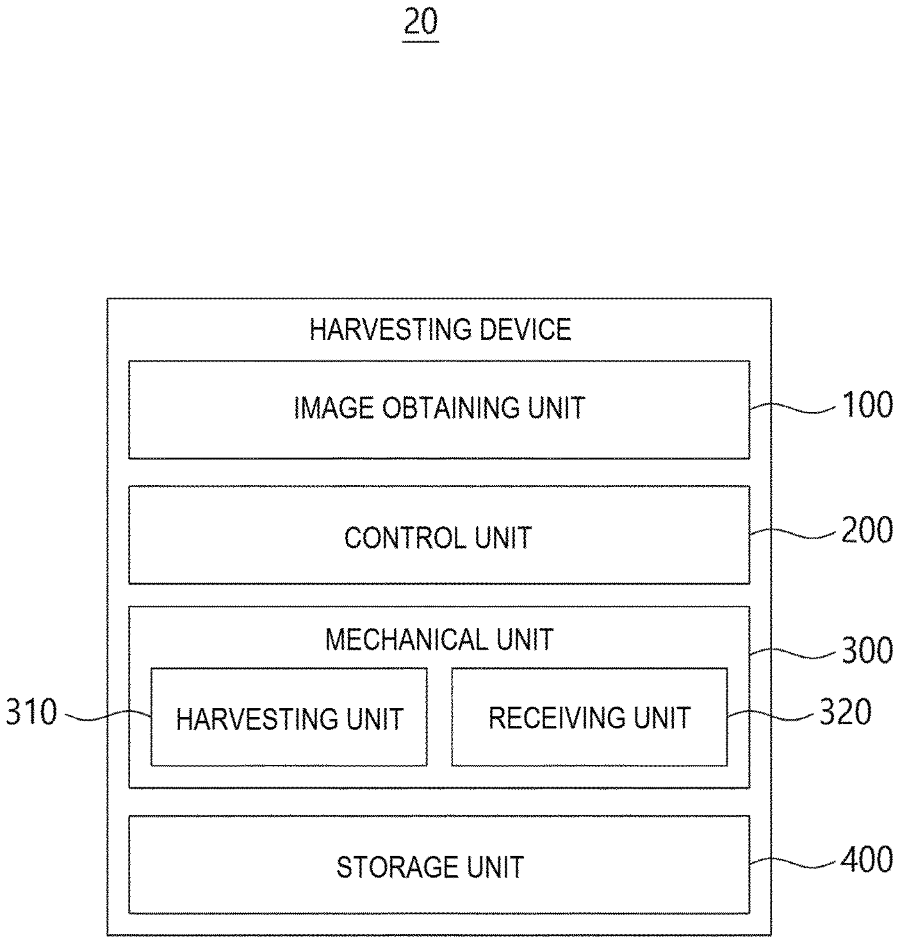
FIG. 2 is a block diagram illustrating a harvesting device according to one embodiment.

FIG. 2 is a block diagram illustrating the harvesting device according to one embodiment.

Referring to FIG. 2, the harvesting device 20, according to one embodiment, may include an image-obtaining unit 100, a control unit 200, a mechanical unit 300, and a storage unit 400.

The image-obtaining unit 100 may be implemented as at least one camera.

The image-obtaining unit 100 may obtain an image. The image-obtaining unit 100 may obtain a crop image including fruit. The image-obtaining unit 100 may obtain a plurality of images.

The image-obtaining unit 100 may transmit the obtained image to the control unit 200 or the storage unit 400.

The image-obtaining unit 100 may be implemented in a form including a distance sensor. The image-obtaining unit 100 may calculate the distance to an object included in the obtained image using a distance sensor. The image-obtaining unit 100 may transmit the calculated distance to the control unit 200.

The control unit 200 may determine information on fruit in the image. The information on fruit may be related to the fruit included in the crop image. In addition, the information on the fruit may include at least one piece of information among information on the ripeness, size, location, and distance of the fruit included in the crop image.

The control unit 200 may determine the target fruit to be harvested on the basis of the information on the fruit. The control unit 200 may differentially determine the target fruit to be harvested depending on a season. The control unit 200 may determine the harvest order of the target fruit to be harvested.

The control unit 200 may calculate the distance to an object included in the image. The control unit 200 may calculate the distance between the fruits included in the image on the basis of the image.

The control unit 200 may include a trained artificial neural network. The artificial neural network may be trained using images. In addition, the artificial neural network may be trained using images and training data. The training data may include labeling data.

The labeling data may include at least one piece of data among data on the ripeness, size, location, and distance of fruit included in the crop image. The labeling data may correspond to the information on fruit determined by the control unit 200.

The control unit 200 may determine the harvest order for the target fruit to be harvested. The control unit 200 may determine the harvest order on the basis of the information on the target fruit to be harvested.

The control unit 200 may transmit the information on the target fruit to be harvested to the mechanical unit 300 or the storage unit 400. The control unit 200 may transmit the information on the harvest order to the mechanical unit 300 or the storage unit 400.

The mechanical unit 300 may include a harvesting unit 310 and a receiving unit 320.

The harvesting unit 310 may harvest fruit. The harvesting unit 310 may harvest the target fruit to be harvested, determined by the control unit. The harvesting unit 310 may harvest fruit according to the fruit harvest order determined by the control unit 200.

The harvesting unit 310 may convey the harvested fruit to the receiving unit 320.

The receiving unit 320 may keep the harvested fruit. The receiving unit 320 may keep fruit on the basis of the information on the fruit. The information on the fruit may include at least one piece of information among information on the ripeness and size of the fruit. For example, the receiving unit 320 may keep the fruit sorted by size. Alternatively, the receiving unit 320 may keep the fruit sorted by the same ripeness on the basis of the ripeness of the fruit.

The storage unit 400 may store the image obtained from the image-obtaining unit 100. The storage unit 400 may store information on the target fruit to be harvested, determined by the control unit 200. Furthermore, the storage unit 400 may store information on the harvest order determined by the control unit 200.

Hereinafter, the artificial neural network included in the control unit will be described in detail.

Figure 3:
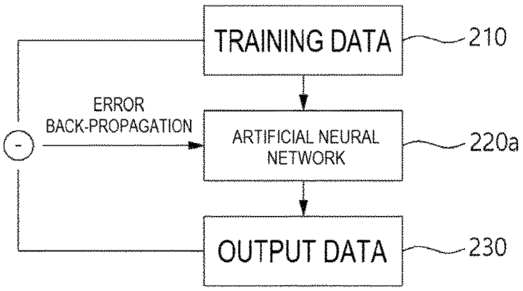
FIG. 3 is a block diagram regarding a training process of an artificial neural network according to one embodiment.

FIG. 3 is a block diagram regarding a training process of the artificial neural network according to one embodiment.

Referring to FIG. 3, the control unit 200 may include the artificial neural network 220A.

The artificial neural network may include a convolutional layer, a pooling layer, a fully-connected layer, and an activating function layer.

The convolutional layer may include at least one filter, and at least one filter may have each feature for a specific shape. For example, an edge filter used to discover the outline of an object may have a feature for a specific shape, such as a line that may cover an image. When applying the edge filter to the image, feature information corresponding to the edge filter may be obtained. A feature map may be extracted using at least one filter included in the convolutional layer.

The pooling layer may be structurally positioned between the convolutional layers. Alternatively, the pooling layer may be positioned after hierarchically positioning a plurality of convolutional layers. The pooling layer performs the function of extracting a specific value for a specific region in the feature map extracted through the convolutional layer. The pooling layer has several types, and examples thereof may include a max pooling layer, a median pooling layer, and the like.

The fully-connected layer may perform the function of classifying an image for the feature map extracted through at least one of the convolutional layer and the pooling layer. For example, the fully-connected layer may classify an image through a hidden layer after positioning feature maps in a row form.

An activation function layer may be applied to the feature map as an activated functional layer. The activation function layer may perform the function of changing the quantitative value after the fully-connected layer into a result regarding whether the feature information is included.

The artificial neural network 220A may be trained with the training data 210.

The training data 210 may be a crop image including fruit. The training data 210 may be a crop image obtained by the image-obtaining unit 100. The training data 210 may be a crop image including a crop image and labeling data. The labeling data may include at least one piece of data among the data on the location, ripeness, size, distance, and column division of fruit included in the crop image.

The artificial neural network 220A may receive the training data 210, output output data 230, and be trained by comparing the training data 210 with the output data 230. According to one embodiment, when the training data 210 includes the labeling data, the output data 230 may include probability values regarding the labeling data.

The artificial neural network 220A may be trained using an error back-propagation method. The error back-propagation method may be a training method performed by including an error between the training data 210 and the output data 230 once again to a node included in the artificial neural network 220A. The artificial neural network 220A may be trained in a way that minimizes the error between the training data 210 and the output data 230.

When inputting an image, the trained artificial neural network may detect an object in the image or classify the type of object. The trained artificial neural network may classify objects according to the properties of the objects in the image.

The trained artificial neural network may receive the crop image including fruit, extract information on fruit from the crop images, and classify the fruit in the crop image accordingly. The information on the fruit may include at least one piece of information among the information on the location, ripeness, size, distance, and column division of the fruit included in the crop image. For example, the trained artificial neural network may receive a crop image and output at least one type of fruit information among the information on the location, ripeness, size, distance, and column division of the fruit included in the crop image.

Hereinafter, training data for training the artificial neural network will be specifically described in detail.

Figure 4:
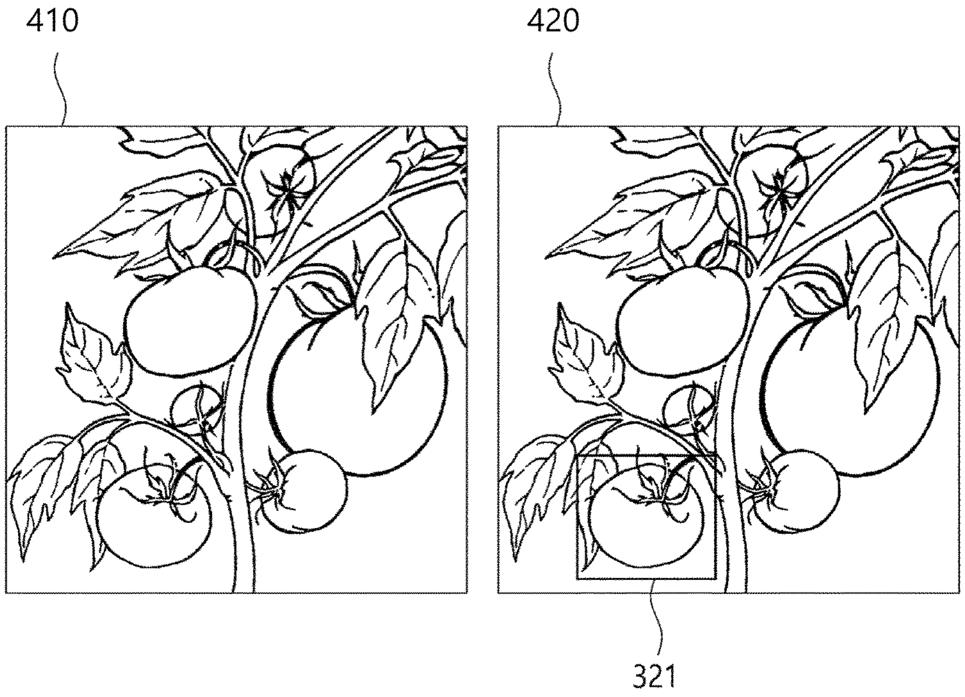
FIG. 4 is a diagram illustrating training data on fruit location according to one embodiment.

FIG. 4 is a diagram illustrating training data on fruit location according to one embodiment.

Referring to FIG. 4, the training data may include a first crop image 410 and a second crop image 420. The second crop image 420 may include the training data on the fruit location. The training data on the fruit location may include labeling data on the fruit location in the image.

Alternatively, the training data may be implemented only as the labeling data without the second crop image 420. For example, the training data may include the first crop image 410 and data implemented only as labeling data with the same image frame as the first crop image 410 without a background image. In this case, when matching the first crop image 410 with the data implemented only as the labeling data without the background image, the second crop image 420, implemented in FIG. 4, may be implemented in a form including the labeling data.

The first crop image 410 and the second crop image 420 may be obtained using the image-obtaining unit 100. The first crop image 410 and the second crop image 420 may be stored in the storage unit 400. In addition, the second crop image 420 may be obtained using the image-obtaining unit 100 and processed using the control unit. Alternatively, the first crop image 410 and the second crop image 420 may be received from an external server.

The first crop image 410 and the second crop image 420 may include at least one fruit. At least one fruit may be the same as or different from each other in at least one of ripeness, size, location, and distance.

The second crop image 420 may include the labeling data on the fruit location. The labeling data on the fruit location may be implemented in the form of a bounding box for a region where the fruit is located.

When implementing the labeling data on the fruit location in the second crop image 420 in the form of a bounding box, the bounding box 321 in the second crop image 420 may be displayed at a location corresponding to the fruit. The bounding box 321 may correspond to at least one fruit but preferably corresponds to one fruit.

The bounding box 321 may be implemented in the form of a rectangle, or may be implemented in the form of a square or rectangle. The location of the bounding box 321 may correspond to a region where the fruit corresponding to the bounding box is located in the second crop image 420.

The inner area of the bounding box 321 may be greater than the area occupied by fruit corresponding to the bounding box 321 in the second crop image 420. For example, an area occupied by the bounding box 321 in the second crop image 420 may be greater than an area occupied by the fruit in the second crop image 420. The area occupied by the fruit may mean an area occupied by the detected fruit when detecting fruit using an image segmentation method.

The bounding box 321 may be matched with a fruit information vector in which information on the fruit corresponding to the bounding box 321 is expressed in a vector form. More specifically, at least one bounding box 321 may be matched with a fruit information vector corresponding to the respective bounding box 321. In addition, the fruit information vector may include information on the fruit.

The fruit information vector may include at least one piece of information among information on the location, ripeness, size, distance, and column division of the fruit. When the fruit information vector includes information on the fruit location, the fruit information vector may have a (X, Y, L, H) form.

When the fruit information vector has a vector form of (X, Y, L, H), (X, Y) may mean the location of the bounding box 321 in the second crop image 320, and (L, H) may represent the area of the bounding box. L may mean the length of one horizontal side of the bounding box 321, and H may mean the length of one vertical side of the bounding box 321. In this case, (X, Y) may be the location coordinate information of the most central point of the bounding box or the location coordinate information of one vertex of the bounding box.

The area of the bounding box 321 may be calculated using L and H of the fruit information vector. In addition, the area may be matched with the size of the fruit corresponding to the fruit information vector. For example, the size of the fruit corresponding to the fruit information vector may be calculated according to the area.

When inputting the first crop image 310 and the second crop image 320 into the artificial neural network as the training data, the artificial neural network may output the output data, determine the error between the output data and the training data, and be trained in a way that minimizes the error.

Hereinafter, training data on the ripeness of fruit will be described with reference to FIG. 5.

Figure 5:
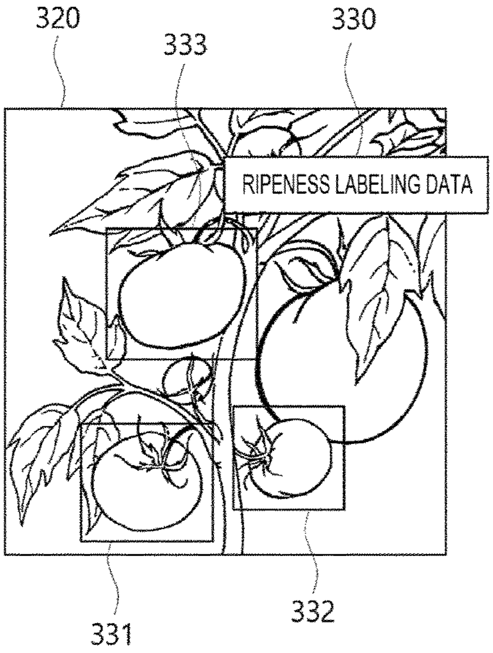
FIG. 5 is a diagram showing training data on fruit ripeness according to one embodiment.

FIG. 5 is a diagram showing the training data on fruit ripeness according to one embodiment.

Referring to FIG. 5, the training data may further include labeling data on fruit ripeness. As described with reference to FIG. 4, the training data may include the second crop image 320 and the training data on the fruit location. Furthermore, the training data may include training data on fruit ripeness.

The training data on fruit ripeness may include fruit ripeness labeling data 330. The fruit ripeness labeling data 330 may be labeled corresponding to at least one fruit in the second crop image 320 for the respective fruits. Accordingly, at least one fruit in the second crop image 320 may be matched with the fruit ripeness labeling data 330, respectively.

The fruit ripeness labeling data 330 may be classification data that classifies the fruit ripeness into at least one ripeness class. For example, when classifying fruit ripeness into "ripe" and "unripe" classes, the fruit ripeness labeling data may correspond to two classes, "ripe" and "unripe". More specifically, as shown in Table A, the fruit ripeness labeling data corresponding to "ripe" may be implemented in vector-form data of (1,0). Alternatively, the fruit ripeness labeling data corresponding to "unripe" may be implemented in vector-form data of (0,1). The form in which the fruit ripeness labeling data is implemented is not to be construed as limited to the above example.

The classification of fruit ripeness into "ripe" and "unripe" classes may be determined by the colors of fruits corresponding to "ripe" and "unripe".

For example, a fruit color corresponding to "ripe" or a fruit color corresponding to "unripe" may typically be one of several colors that fruit may have after fruiting.

More specifically, in the case of the fruit corresponding to "ripe", time, based on the fruiting time, may have further elapsed compared to that in the case of the fruit corresponding to "unripe". In other words, when the fruit corresponding to "ripe" and the fruit corresponding to "unripe" have the same fruiting time, more time, based on the fruiting time, may have elapsed in the case of the fruit corresponding to "ripe".

Therefore, the fruit color corresponding to "ripe" may correspond to the color that the fruit may have when more time, based on the fruiting time, has elapsed. In addition, the fruit color corresponding to "unripe" may correspond to the color that the fruit may have when a relatively shorter time, based on the fruiting time, has elapsed.

Furthermore, when classifying the fruit color corresponding to "ripe" and the fruit color corresponding to "unripe", an RGB color histogram may be used. For example, when plotting the inner region of the bounding box in the second crop image 320 using the RGB color histogram, color information on pixels in the inner region of a bounding box 331 may be extracted. In this case, the fruit color corresponding to "ripe" may correspond to a case where the number of red color pixels is relatively greater than the number of green color pixels in the inner region of the bounding box 331. Alternatively, the fruit color corresponding to "unripe" may correspond to a case where the number of green color pixels is relatively greater than the number of red color pixels in the inner region of a bounding box 332.

The case described above may be applied when the crop is a tomato. When the crop grown in the greenhouse is another crop, the pixel color types corresponding to "ripe" and "unripe" and the relative number of pixels may vary.

In addition, when using the RGB color histogram, only a fruit portion in the inner region of the bounding box may be extracted and plotted. More specifically, the image segmentation method may be used in the inner region of the bounding box to detect the fruit, and only the detected fruit region may be plotted using the RGB color histogram.

In this case, the number of red color pixels and the number of green color pixels in the region where the fruit is detected may be compared to be matched with the fruit ripeness.

According to another example, when using the RGB color histogram, the fruit region may be extracted by setting a point where the color pixel changes rapidly in the inner region of the bounding box as an edge. In this case, the number of red color pixels and the number of green color pixels in the inner region of the edge may be compared to be matched with the fruit ripeness.

The fruit ripeness may be classified into two classes, "ripe" and "unripe", but may also be classified into at least three ripeness classes of "first ripeness", "second ripeness", and "third ripeness".

Through this, the fruit ripeness is not to be construed as limited to be classified according to whether the fruit is ripe and may be further classified minutely into various ripeness classes.

In addition, when classifying the fruit ripeness into at least three different ripeness classes, fruit may be classified in various ways on the basis of the ripeness. Through this, the fruit classified to have the same ripeness may be harvested together on the basis of the ripeness during fruit harvest. In addition, in terms of storing fruit after harvest, fruits having the same ripeness may be stored together. Furthermore, when classifying the fruit ripeness into three or more classes, fruit may be harvested and distributed differentially on the basis of the ripeness by taking into account the time required for the distribution process from harvest until supply to the final consumer. Through this, the most optimal fruit ripeness state may be maintained when supplying the fruit to the final consumer, which is advantageous.

Referring to FIG. 5, one example of the training data in which the fruit ripeness is classified into at least three classes may be confirmed. The second crop image 320 may include at least three types of fruit. In this case, a first fruit may correspond to a first bounding box 331, a second fruit may correspond to a second bounding box 332, and a third fruit may correspond to a third bounding box 333.

The first bounding box 331, the second bounding box 332, and the third bounding box 333 may be the labeling data on the fruit location, described above with reference to FIG. 4. The respective fruits corresponding to the bounding boxes may differ in fruit ripeness. For example, the first fruit may correspond to the third ripeness, the second fruit may correspond to the first ripeness, and the third fruit may correspond to the second ripeness. When classifying the fruit ripeness into the classes of "first ripeness", "second ripeness", and "third ripeness", "second ripeness" may mean that the corresponding fruit has a greater ripeness than the fruit corresponding to "first ripeness". In addition, "third ripeness" may mean that the corresponding fruit has a greater ripeness than the fruit corresponding to "second ripeness".

Referring to Table B of FIG. 5, the fruit ripeness labeling data 330 may be classified into "first ripeness", "second ripeness", and "third ripeness". The fruit ripeness labeling data may be implemented as labeling data of 0 when corresponding to "first ripeness", labeling data of 1 when corresponding to "second ripeness", and labeling data of 2 when corresponding to "third ripeness". The form in which the fruit ripeness labeling data is implemented is not to be construed as limited to the above example.

The classification of the fruit ripeness into three or more classes may be determined by the fruit colors corresponding to the respective classes.

For example, the fruit color corresponding to "first ripeness", the fruit color corresponding to "second ripeness", and the fruit color corresponding to "third ripeness" be one of several colors that the fruit may have after fruiting.

More specifically, in the case of the fruit corresponding to "first ripeness", time, based on the fruiting time, may have further elapsed compared to that in the case of the fruit corresponding to "second ripeness". In the case of the fruit corresponding to "third ripeness", time, based on the fruiting time, may have further elapsed compared to that in the case of the fruit corresponding to "second ripeness". In other words, when the fruit corresponding to "first ripeness", the fruit corresponding to "second ripeness", and the fruit corresponding to "third ripeness" have the same fruiting time, more time, based on the fruiting time, may have elapsed in the order of the fruit corresponding to "first ripeness", the fruit corresponding to "second ripeness", and the fruit corresponding to "third ripeness".

Therefore, the fruit color corresponding to "third ripeness" may correspond to the color that the fruit may have when more time, based on the fruiting time, has elapsed. In addition, the fruit color corresponding to "second ripeness" may correspond to the color that the fruit may have when a relatively shorter time, based on the fruiting time, has elapsed than in the case of the fruit corresponding to "third ripeness".

In addition, the fruit color corresponding to "first ripeness" may correspond to the color that the fruit may have when a relatively shorter time, based on the fruiting time, has elapsed than in the case of the fruit corresponding to "second ripeness".

Furthermore, an RGB color histogram may be used when classifying the fruit color corresponding to "first ripeness", the fruit color corresponding to "second ripeness", and the fruit color corresponding to "third ripeness". For example, when plotting the inner region of the bounding box in the second crop image 320 using the RGB color histogram, color information on pixels in the inner region of the bounding box 331 may be extracted. In this case, the fruit color corresponding to "third ripeness" may correspond to a case where the number of red color pixels is relatively greater than the number of green color pixels in the inner region of the bounding box 331. Alternatively, the fruit color corresponding to "first ripeness" may correspond to a case where the number of green color pixels is relatively greater than the number of red color pixels in the inner region of the bounding box 332. Furthermore, the fruit color corresponding to "second ripeness" may correspond to a case where the number of red color pixels in the inner region of the bounding box 333 is smaller than the number of red color pixels in the inner region of the bounding box 321 but is greater than the number of red color pixels in the inner region of the bounding box 332.

The case described above may be applied when the crop is a tomato. When the crop grown in the greenhouse is another crop, the pixel color types corresponding to a variety of fruit ripeness and the relative number of pixels may vary.

In addition, when using the RGB color histogram, only a fruit portion in the inner region of the bounding box may be extracted and plotted. More specifically, the image segmentation method may be used in the inner region of the bounding box to detect the fruit, and only the detected fruit region may be plotted using the RGB Color Histogram.

In this case, the number of red color pixels and the number of green color pixels in the region where the fruit is detected may be compared to be matched with the fruit ripeness.

According to another example, when using the RGB color histogram, the fruit region may be extracted by setting a point where the color pixel changes rapidly in the inner region of the bounding box as an edge. In this case, the number of red color pixels and the number of green color pixels in the inner region of the edge may be compared to be matched with the fruit ripeness.

The fruit information vector, described above with reference to FIG. 4, may include the fruit ripeness labeling data. More specifically, the fruit information vector may include the fruit ripeness labeling data with the labeling data on the fruit location in FIG. 4.

More specifically, the fruit information vector may be implemented in a (fruit location labeling data, fruit ripeness labeling data) form. For example, the fruit information vector may have a (X, Y, L, H, (1,0)) form when classifying the fruit ripeness as "ripe" or "unripe". Alternatively, the fruit information vector may have a (X, Y, L, H, 1) form when classifying the fruit ripeness into at least three classes.

Hereinafter, training data on the size of fruit will be described.

Figure 6:
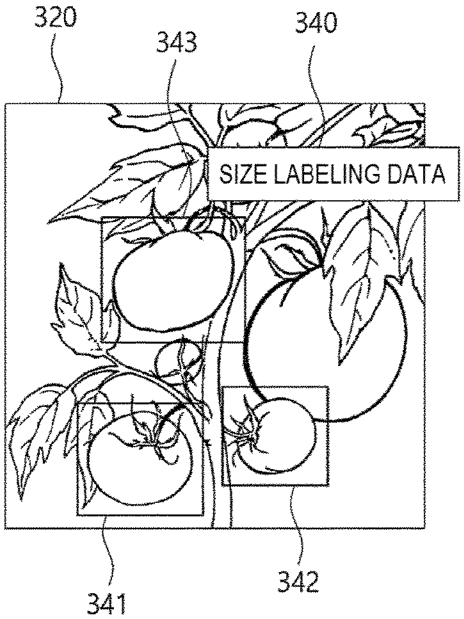
FIG. 6 is a diagram showing training data on fruit size according to one embodiment.

FIG. 6 is a diagram showing the training data on fruit size according to one embodiment.

Referring to FIG. 6, the training data may further include labeling data on fruit size. As described with reference to FIG. 4, the training data may include the second crop image 320 and the training data on the fruit location. Furthermore, the training data may include training data on fruit size.

Referring to Table A, the training data on fruit size may include fruit size labeling data 340. The fruit size labeling data 340 may be labeled corresponding to at least one fruit in the second crop image 320 for the respective fruits. Accordingly, at least one fruit in the second crop image 320 may be matched with the fruit size labeling data 340, respectively.

The fruit size labeling data 340 may be classification data that classifies the fruit size into at least one size class. For example, when classifying the fruit size into "large size" and "small size" classes, the fruit size labeling data may correspond to two classes, "large size" and "small size". More specifically, as shown in Table A, the fruit size labeling data corresponding to "large size" may be implemented in vector-form data of (1,0). Alternatively, the fruit size labeling data corresponding to "small size" may be implemented in vector-form data of (0,1). The form in which the fruit size labeling data is implemented is not to be construed as limited to the above example.

In addition, as described above with reference to FIG. 4, the fruit information vector may include the fruit size labeling data. For example, the fruit information vector may be implemented in a (fruit location labeling data, fruit size labeling data) form, or may include the fruit ripeness labeling data described above with reference to FIG. 5. Looking into the fruit information vector implemented accordingly, the fruit information vector may be implemented as (fruit location labeling data, fruit ripeness labeling data, fruit size labeling data). For example, the fruit information vector may be implemented as (X, Y, L, H, (1,0), (1,0)).

The classification of the fruit size into "large size" and "small size" classes may be performed according to the areas of regions occupied by fruits corresponding to "large size" and "small size".

For example, the area of the region occupied by the fruit corresponding to "large size" may be greater than the area of the region occupied by the fruit corresponding to "small size".

Alternatively, the classification may be performed using the fruit location labeling data included in the fruit information vector described above. More specifically, when implementing the fruit information vector as (X, Y, L, H), the fruit size may be obtained according to the area calculated using L and H. For example, as for first and second areas calculated using L and H, when the first area is greater than the second area, the fruit size corresponding to the first area may become "large size" and the fruit size corresponding to the second area may become "small size".

The fruit size may be classified into two classes, "large size" and "small size", but may also be classified into at least three size classes of "first size", "second size", and "third size".

Through this, the fruit size is not to be construed as limited to be classified according to the two sizes and may be further classified minutely into various size classes. In this case, fruit classified to have similar sizes may be harvested together during fruit harvest, so that fruit is not required to be classified by size separately after the harvest, which is effective.

Referring to FIG. 6, one example of the training data in which the fruit size is classified into at least three classes may be confirmed. The second crop image 320 may include at least three types of fruit. In this case, a first fruit may correspond to a first bounding box 341, a second fruit may correspond to a second bounding box 342, and a third fruit may correspond to a third bounding box 343.

The first bounding box 341, the second bounding box 342, and the third bounding box 343 may be the labeling data on the fruit location, described above with reference to FIG. 4. The respective fruits corresponding to the bounding boxes may differ in fruit size. For example, the first fruit may correspond to the third size, the second fruit may correspond to the first size, and the third fruit may correspond to the second size.

When classifying the fruit size into the classes of "first size", "second size", and "third size", "second size" may mean that the corresponding fruit has a greater size than the fruit corresponding to "first size". In addition, "third size" may mean that the corresponding fruit has a greater size than the fruit corresponding to "second size".

Referring to Table B of FIG. 6, the fruit size labeling data 340 may be classified into "first size", "second size", and "third size". The fruit size labeling data may be implemented as labeling data of 0 when corresponding to "first size", labeling data of 1 when corresponding to "second size", and labeling data of 2 when corresponding to "third size". The form in which the fruit size labeling data is implemented is not to be construed as limited to the above example.

The classification of the fruit size into three or more classes may be determined by the fruit sizes corresponding to the respective classes.

The classification of the fruit size into "first size", "second size", and "third size" classes may be performed according to the area of regions occupied by fruit corresponding to "first size", fruit corresponding to "second size", and fruit corresponding to "third size".

For example, the area of the region occupied by the fruit corresponding to "third size" may be greater than the area of the region occupied by the fruit corresponding to "second size". In addition, the area of the region occupied by the fruit corresponding to "second size" may be greater than the area of the region occupied by the fruit corresponding to "first size".

Alternatively, the classification may be performed using the fruit location labeling data included in the fruit information vector described above. More specifically, when implementing the fruit information vector as (X, Y, L, H), the fruit size may be obtained according to the area calculated using L and H. For example, first, second, and third areas calculated using L and H may correspond to "third size", "second size", and "first size" in the order of largest to smallest.

The fruit information vector, described above with reference to FIG. 4, may include the fruit size labeling data. More specifically, the fruit information vector may include the fruit size labeling data with the labeling data on the fruit location in FIG. 4.

More specifically, the fruit information vector may be implemented in a (fruit location labeling data, fruit size labeling data) form. For example, the fruit information vector may have a (X, Y, L, H, 1) form when classifying the fruit size into three classes. Alternatively, the fruit information vector may also include the fruit ripeness labeling data. For example, the fruit information vector may be implemented in a (fruit location labeling data, fruit ripeness labeling data, fruit size labeling data) form.

The fruit size described above may mean the size of the fruit in the crop image. This is because the crop image typically includes crops grown in the same column in a greenhouse. Therefore, the fruit size in the crop image may be calculated and thus determined in correspondence with the actual fruit size.

However, even when the crop image includes crops grown in the same column in the greenhouse, the relative distance between each crop may vary. Hereinafter, training data on the distance of fruit will be described.

Figure 7:
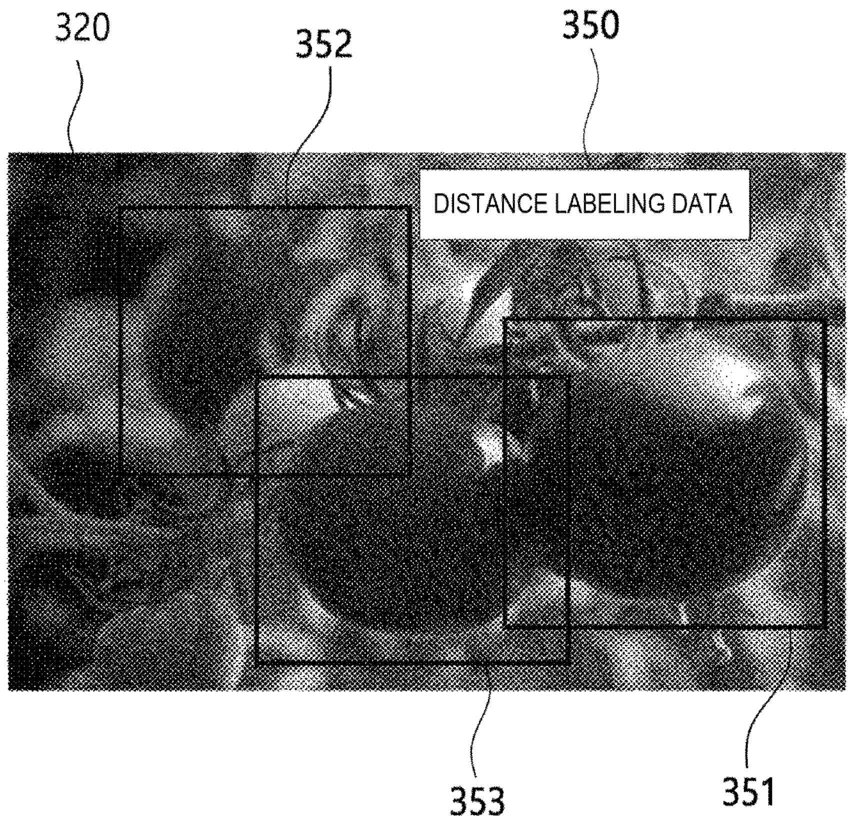
FIG. 7 is a diagram showing training data on fruit distance according to one embodiment.

FIG. 7 is a diagram showing training data on fruit distance according to one embodiment.

Referring to FIG. 7, the training data may further include labeling data on fruit distance. As described with reference to FIG. 4, the training data may include the second crop image 320 and the training data on the fruit location. Furthermore, the training data may include training data on fruit distance.

The fruit distance may mean the depth of a region where the fruit is located in the crop image. Alternatively, the fruit distance may be a distance from the image-obtaining unit in the harvesting device to a point where the fruit is actually located.

The training data on fruit distance may include fruit distance labeling data 350. The fruit distance labeling data 350 may be labeled corresponding to at least one fruit in the second crop image 320 for the respective fruits. Accordingly, at least one fruit in the second crop image 320 may be matched with the fruit distance labeling data 350, respectively.

Referring to Table A, the fruit distance labeling data 350 may be classification data that classifies the fruit distance into at least one distance class. For example, when classifying the fruit distance into "adjacent distance" and "spaced distance" classes, the fruit distance labeling data may correspond to two classes, "adjacent distance" and "spaced distance". More specifically, as shown in Table A, the fruit distance labeling data corresponding to "adjacent distance" may be implemented in vector-form data of (1,0). Alternatively, the fruit distance labeling data corresponding to "spaced distance" may be implemented in vector-form data of (0,1). The form in which the fruit distance labeling data is implemented is not to be construed as limited to the above example.

In this case, "adjacent distance" and "spaced distance" may be divided by comparing the depth of the region where the fruit is located in the crop image. For example, the fruit corresponding to "spaced distance" may be positioned in a relatively deeper region than the fruit corresponding to "adjacent distance".

In addition, as described above with reference to FIG. 4, the fruit information vector may include the fruit distance labeling data. For example, the fruit information vector may be implemented as (fruit location labeling data, fruit distance labeling data). Alternatively, the fruit information vector may include the fruit ripeness labeling data and the fruit size labeling data. Looking into the fruit information vector implemented accordingly, the fruit information vector may be implemented as a (fruit location labeling data, fruit ripeness labeling data, fruit size labeling data, fruit distance labeling data) form. For example, the fruit information vector may be implemented as (X, Y, L, H, (1,0), (1,0)).

The classification of the fruit distance into "adjacent distance" and "spaced distance" classes may be performed according to the area of regions occupied by fruit corresponding to "adjacent distance" and fruit corresponding to "spaced distance".

For example, the area of the region occupied by the fruit corresponding to "adjacent distance" may be greater than the area of the region occupied by the fruit corresponding to "spaced distance".

Alternatively, the classification may be performed using the fruit location labeling data included in the fruit information vector described above. More specifically, when implementing the fruit information vector as (X, Y, L, H), the fruit distance may be obtained according to the area calculated using L and H. For example, as for first and second areas calculated using L and H, when the first area is greater than the second area, the fruit distance corresponding to the first area may become "adjacent distance", and the fruit distance corresponding to the second area may become "spaced distance".

The fruit distance may be classified into two classes, "adjacent distance" and "spaced distance". However, the fruit distance may also be classified into at least three distance classes of "first distance", "second distance", and "third distance".

Through this, the fruit distance is not to be construed as limited to be classified according to the two types and may be further classified minutely as various distance classes.

Referring to FIG. 7, one example of the training data in which the fruit distance is classified into at least three classes may be confirmed. The second crop image 320 may include at least three types of fruits. In this case, a first fruit may correspond to a first bounding box 351, a second fruit may correspond to a second bounding box 352, and a third fruit may correspond to a third bounding box 353.

The first bounding box 351, the second bounding box 352, and the third bounding box 353 may be the labeling data on the fruit location, described above with reference to FIG. 4. The respective fruits corresponding to the bounding boxes may differ in fruit distance. For example, the first fruit may correspond to the third distance, the second fruit may correspond to the first distance, and the third fruit may correspond to the second distance.

When classifying the fruit distance into the classes of "first distance", "second distance", and "third distance", "second distance" may mean that the corresponding fruit has a shorter distance than the fruit corresponding to "first distance". In addition, "third distance" may mean that the corresponding fruit has a shorter distance than the fruit corresponding to "second distance".

Referring to Table B of FIG. 7 the fruit distance labeling data 350 may be classified into "first distance", "second distance", and "third distance". The fruit distance labeling data may be implemented as labeling data of 0 when being matched with "first distance", labeling data of 1 when being matched with "second distance", and labeling data of 2 when being matched with "third distance". The form in which the fruit distance labeling data is implemented is not to be construed as limited to the above example.

The classification of the fruit distance as three or more classes may be determined by the fruit distances corresponding to the respective classes.

The classification of the fruit distance into "first distance", "second distance", and "third distance" classes may be performed according to the area of the region occupied by the fruit corresponding to "first distance", the fruit corresponding to "second distance", and the fruit corresponding to "third distance". This is because in the greenhouse described above with reference to FIG. 1, due to a system capable of providing a homogeneous environment being established, fruit obtained from the fruiting of the crops grown in the greenhouse may have a relatively uniform state. That is, the actual difference between the sizes of fruits growing in the greenhouse is small, so the area occupied by the fruit in the crop image may correspond to the fruit distance.

For example, the area of the region occupied by the fruit corresponding to "third distance" may be greater than the area of the region occupied by the fruit corresponding to "second distance". In addition, the area of the region occupied by the fruit corresponding to "second distance" may be greater than the area of the region occupied by the fruit corresponding to "first distance".

Alternatively, the classification may be performed using the fruit location labeling data included in the fruit information vector described above. More specifically, when implementing the fruit information vector as (X, Y, L, H), the fruit distance may be obtained according to the area calculated using L and H. For example, first, second, and third areas calculated using L and H may correspond to "third distance", "second distance", and "first distance" in the order of largest to smallest.

The fruit information vector, described above with reference to FIG. 4, may include the fruit distance labeling data. More specifically, the fruit information vector may include the fruit distance labeling data with the labeling data on the fruit location in FIG. 4.

More specifically, the fruit information vector may be implemented in a (fruit location labeling data, fruit distance labeling data) form. For example, the fruit information vector may have a (X, Y, L, H, 1) form when classifying the fruit distance into three classes. Alternatively, the fruit information vector may also include the fruit ripeness labeling data and the fruit size labeling data. For example, the fruit information vector may be implemented in a (fruit location labeling data, fruit ripeness labeling data, fruit size labeling data, fruit distance labeling data) form.

As for the fruit distance described above, separate equipment installed in the harvesting device may be used. More specifically, the fruit distance labeling data may be generated on the basis of the actual distance using a distance sensor installed in the harvesting device. For example, when the harvesting device obtains a crop image, the distance sensor may measure the actual distance of each fruit included in the crop image. The actual distance may be transmitted to the control unit, and the control unit may then generate the fruit distance labeling data on the basis of the actual distance.

As one example, the control unit may generate the fruit distance labeling data for the fruits corresponding to "first distance", "second distance", and "third distance", described above, according to values set by the user. The values set by the user may be a value set on the basis of the actual distance measured using the distance sensor.

As for another method, the fruit distance may be calculated on the basis of an occluded region in the crop image. More specifically, as for the crop image, the control unit may determine an occluded region for each fruit included in the crop image. In the crop image, the occluded region may mean a region where fruit is occluded by leaves, backgrounds, twigs, or other fruits. The occluded region may be calculated on the basis of the number of pixels for each fruit. That is, the area of the occluded region may be calculated by counting the number of pixels overlapped with one fruit in the crop image.

The control unit may determine the fruit distance on the basis of the occluded region.

The control unit may determine that fruit with a greater occluded region is fruit with a greater distance. For example, the control unit may calculate a first occluded region for a first fruit and a second occluded region for a second fruit. When the first occluded region is greater than the second occluded region, the distance of the first fruit may be determined to be greater than the distance of the second fruit. The control unit may generate the distance labeling data using such a method.

The control unit may determine a relative distance between the plurality of fruits and a photographing unit on the basis of the occluded region.

Hereinafter, training data including labeling data on fruit column division will be described.

Figure 8:
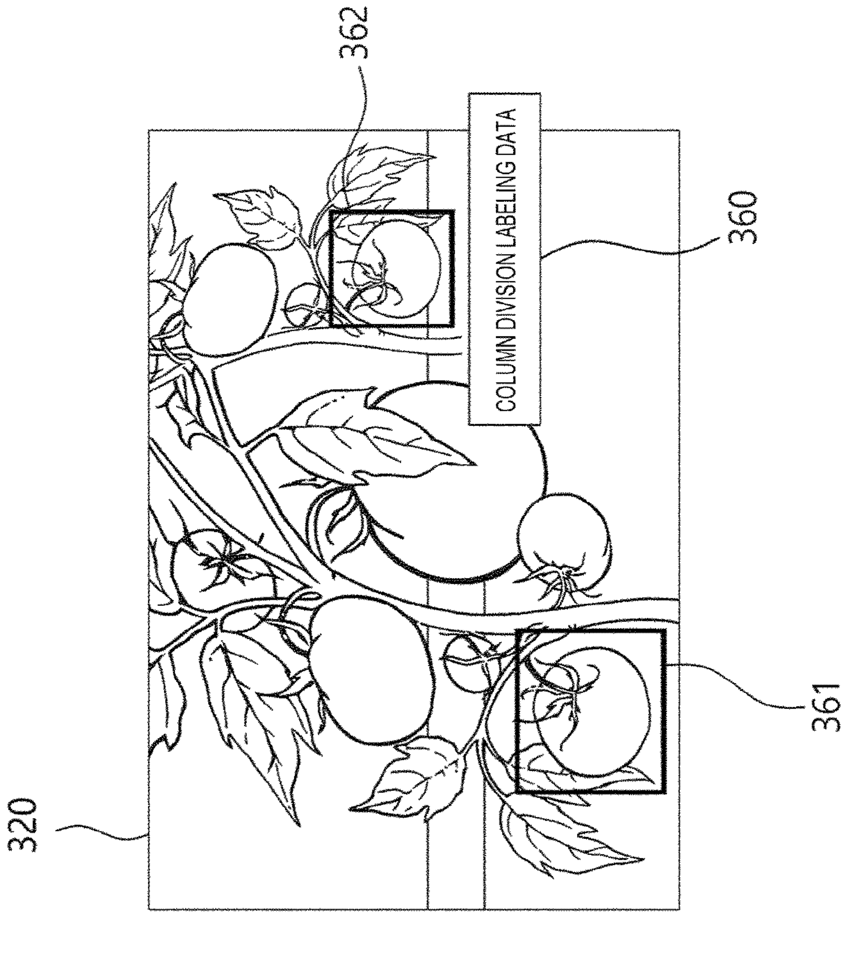
FIG. 8 is a diagram showing training data on fruit distance according to one embodiment.

FIG. 8 is a diagram showing training data on column division according to one embodiment.

Referring to FIG. 8, the training data may further include labeling data on fruit column division. As described with reference to FIG. 4, the training data may include the second crop image 320 and the training data on the fruit location. Furthermore, the training data may include training data on the fruit column.

The fruit column may mean a column where the fruit is located in the crop image. As described above with reference to FIG. 1, crops may grow in the greenhouse by being classified according to columns. The crop image obtained by the harvesting device may include all the first-column crop, the second-column crop, and the third-column crop. When the harvesting device determines the target fruit to be harvested at a position adjacent to the first-column crop to harvest the fruit, the crops growing in the second and third columns are required not to be determined as the target fruit to be harvested. This is because when the harvesting device is positioned adjacent to the first-column crop, it is more efficient to determine and harvest only the first-column crop as the target fruit to be harvested in terms of harvest efficiency. The second-column crop and the third-column crop are determined as the target fruit to be harvested when the harvesting device is positioned adjacent to each of the second-column crop and the third-column crop, which is further efficient when the harvesting device harvests the fruit.

In addition, for the efficiency of the process in which the harvesting device determines the target fruit to be harvested, it is preferable not to determine the second-column crop and the third-column crop as the target fruit to be harvested. Furthermore, the harvesting device may be unable to harvest the second-column crop and the third-column crop, so the crops growing in the second and third columns are preferably not to be determined as the target fruit to be harvested.

Therefore, the harvesting device needs to divide the column of the fruit included in the crop image.

To this end, the training data on the fruit column may be used. The training data on the fruit column may include fruit column labeling data 360. The fruit column labeling data 360 may be labeled corresponding to at least one fruit in the second crop image 320 for the respective fruits. Accordingly, at least one fruit in the second crop image 320 may be matched with the fruit column labeling data 360, respectively.

First, referring to Table A, the fruit column labeling data may be implemented on the fruit positioned in an adjacent column with respect to at least one fruit in the second crop image 320. More specifically, as shown in Table A, when the fruit is positioned in the adjacent column, the fruit column labeling data may be labeled with 1.

Alternatively, when classifying the fruit column into "adjacent column" and "spaced column" classes, the fruit column labeling data may correspond to two classes, "adjacent column" and "spaced column". More specifically, as shown in Table B, the fruit column labeling data corresponding to "adjacent column" may be implemented in vector-form data of (1,0). Alternatively, the fruit column labeling data corresponding to "spaced column" may be implemented in vector-form data of (0,1). The form in which the fruit column labeling data is implemented is not to be construed as limited to the above example.

Referring to FIG. 8, when labeling only the adjacent column in the crop image according to Table A, a first bounding box 361 may be implemented for a first fruit included in a second crop image 320. In addition, the first bounding box may correspond to adjacent column labeling data.

Alternatively, when being labeled as "adjacent column" and "spaced column" in the crop image according to Table B, the first bounding box 361 for the first fruit and a second bounding box 362 for a second fruit, included in the second crop image 320, may be implemented. In addition, the first bounding box 361 may correspond to adjacent column labeling data, and the second bounding box 362 may correspond to spaced column labeling data.

In this case, "adjacent column" and "spaced column" may be divided according to the column where the fruit is located in the crop image. For example, fruit corresponding to "spaced column" may be fruit located in the second or third column when the harvesting device obtains the crop image while looking at the direction of the first, second, and third columns from a position adjacent to the first column. In addition, fruit corresponding to "adjacent column" may be fruit located in the first column.

In addition, as described above with reference to FIG. 4, the fruit information vector may include the fruit column labeling data. For example, the fruit information vector may be implemented as (fruit location labeling data, fruit column labeling data), or may include the fruit ripeness labeling data, the fruit size labeling data, and the fruit distance labeling data. Looking into the fruit information vector implemented accordingly, the fruit information vector may be implemented as (fruit location labeling data, fruit ripeness labeling data, fruit size labeling data, fruit distance labeling data, fruit column labeling data). For example, the fruit information vector may be implemented as (X, Y, L, H (1,0), (1,0), (1,0), (1,0)).

The classification of the fruit column into “adjacent column” and “spaced column” classes may be performed according to the area of the region occupied by the fruit corresponding to “adjacent column” and the fruit corresponding to “spaced column”.

For example, the area of the region occupied by the fruit corresponding to “adjacent column” may be greater than the area of the region occupied by the fruit corresponding to “spaced column”.

Alternatively, the classification may be performed using the fruit location labeling data included in the fruit information vector described above. More specifically, when implementing the fruit information vector as (X, Y, L, H), the fruit column may be obtained according to the area calculated using L and H. For example, as for first and second areas calculated using L and H, when the first area is greater than the second area, the fruit column corresponding to the first area may become “adjacent column” and the fruit column corresponding to the second area may become “spaced column”. Alternatively, while the control unit has a reference value, the fruit column may be determined as “adjacent column” when the first area is greater than the reference value, or may be determined as “spaced column” when the second area is smaller than the reference value.

In addition, the fruit column, described above, may be classified on the basis of the resolution of a fruit region included in the crop image. More specifically, a fruit region corresponding to “adjacent column” and a fruit region corresponding to “spaced column” may differ in resolution in the crop image. For example, the control unit may calculate a first resolution for a region of a first fruit and a second resolution for a region of a second fruit in the crop image. When the first resolution is higher than the second resolution, the first fruit may be labeled with data corresponding to the adjacent column, and the second fruit may be labeled with data corresponding to the spaced column.

Hereinafter, a method of determining the target fruit to be harvested on the basis of the crop image using an artificial neural network trained using the training data and determining the harvest order for the determined target fruit to be harvested will be described.

Figure 9:
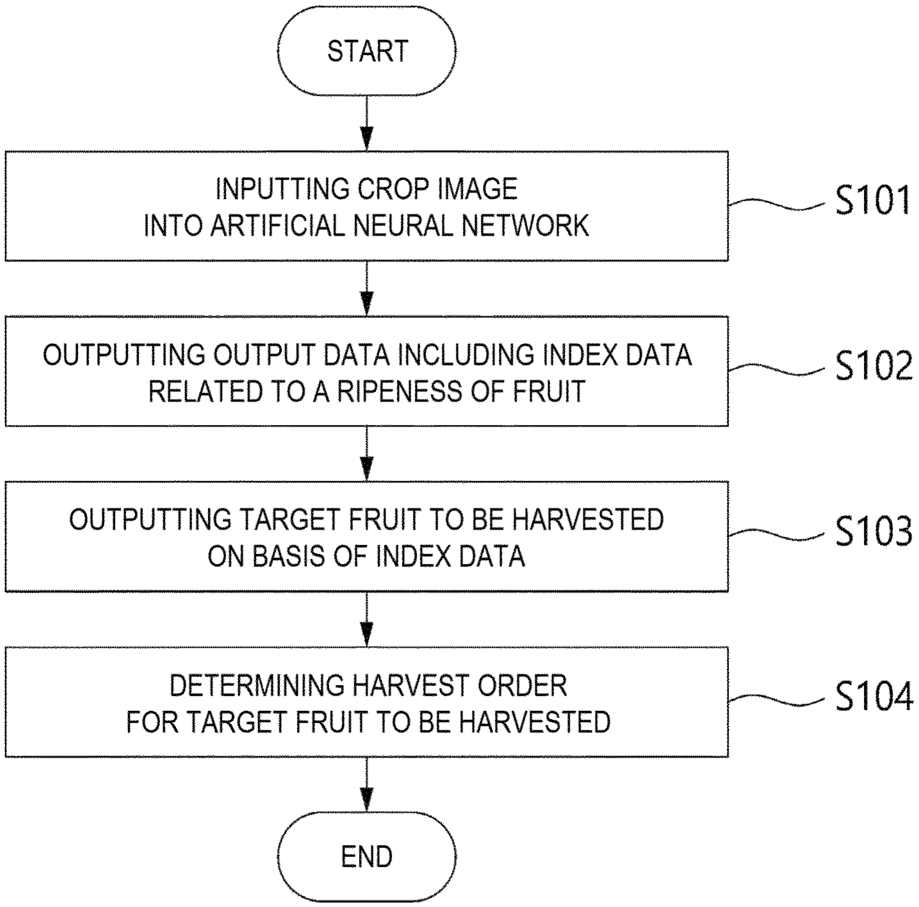
FIG. 9 is a flowchart illustrating a method of outputting target fruit to be harvested and determining a harvest order, according to one embodiment.

FIG. 9 is a flowchart illustrating a method of outputting the target fruit to be harvested and determining the harvest order, according to one embodiment.

Referring to FIG. 9, a method of outputting the target fruit to be harvested from the control unit in the harvesting device and determining the harvest order may include: S101 of inputting a crop image into an artificial neural network, S102 of outputting output data including index data on fruit ripeness from the artificial neural network, S103 of outputting the target fruit to be harvested from the control unit on the basis of the index data, and S104 of determining the harvest order for the target fruit to be harvested by the control unit.

The control unit in the harvesting device may include the artificial neural network. The artificial neural network may be trained using the training data according to FIGS. 4 to 8.

The crop image may be used as the training data in FIGS. 4 to 8 but preferably is different from the crop image used as the training data. The crop image may include at least one fruit in the image. The crop image may be obtained using the harvesting device in real-time while the harvesting device moves within the greenhouse.

The control unit may output the output data including the index data on the fruit ripeness. The output data may include data on the fruit location and may include the index data. The index data may include at least one piece of index data among data on the ripeness, size, distance, and column division of the fruit. The index data may correspond to labeling data on the fruit ripeness, size, distance, and column division, described above with reference to FIGS. 5 to 8. More specifically, the index data may correspond to the fruit information vector described above with reference to FIGS. 5 to 8.

The control unit may determine and output the target fruit to be harvested on the basis of the index data. The target fruit to be harvested may be related to the fruit ripeness among the index data. In addition, the control unit may differentially determine the target fruit to be harvested depending on the season in which the target fruit to be harvested is determined.

The control unit may determine the harvest order for the target fruit to be harvested. The control unit may determine the harvest order on the basis of the index data. The index data may correspond to the fruit information vector described above with reference to FIGS. 5 to 8, and thus may include index data on the ripeness, size, distance, and column of the fruit.

The control unit may determine the harvest order on the basis of the index data on the size of the index data. For example, the control unit may control fruit whose size labeling data is 2 to be harvested first, fruit whose size labeling data is 1 to be harvested next, and fruit whose size labeling data is 0 to be harvested last.

Hereinafter, the output data output from the control unit, a method of determining the target fruit to be harvested, and the harvest order determined by the control unit will be described in detail, with reference to FIGS. 10 to 12.

Figure 10:
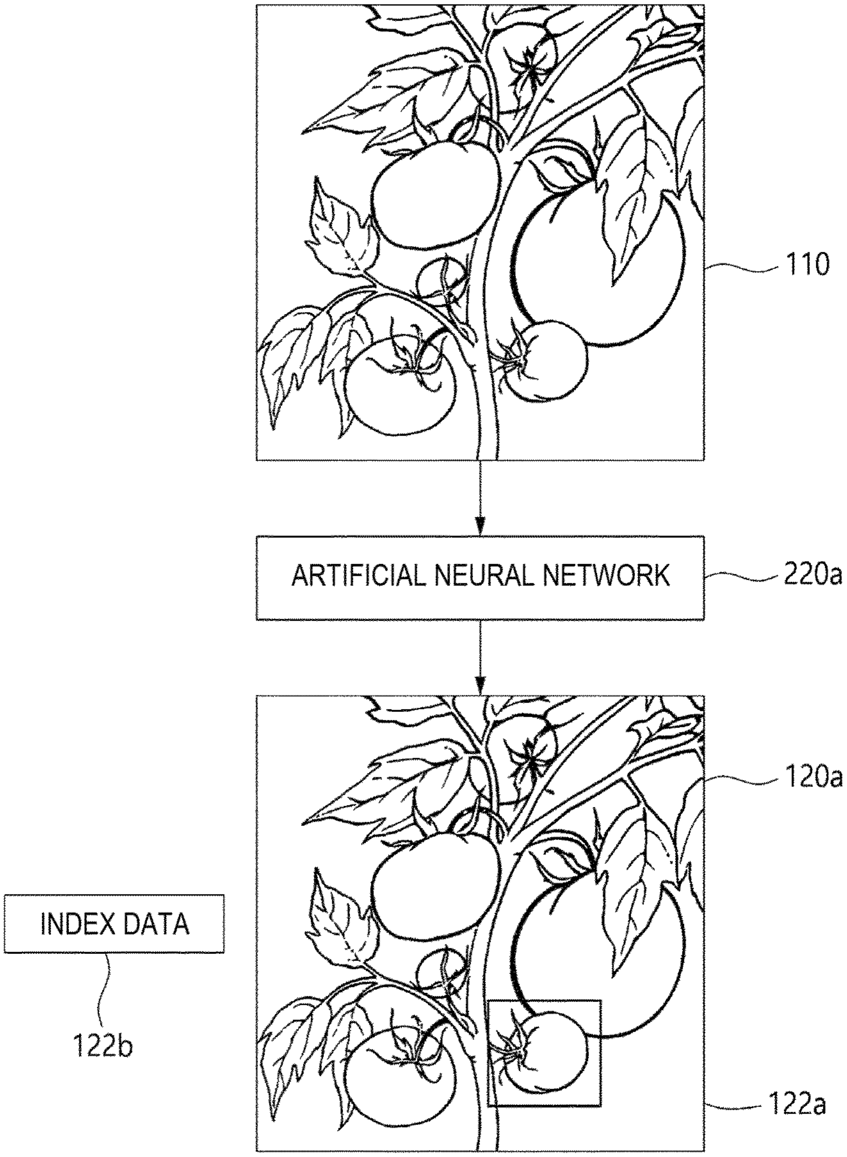
FIG. 10 is a diagram regarding output data that is output from a control unit according to one embodiment.

FIG. 10 a diagram regarding the output data that is output from the control unit according to one embodiment.

Referring to FIG. 10, one example regarding the output data in which the control unit, described above with reference to FIG. 9, includes the index data on the fruit ripeness may be confirmed.

When inputting the crop image 110 into the artificial neural network 220A in the control unit, the artificial neural network 220A may output the output data 120A. The output data 120A may include output data 122A on the fruit location displayed on the crop image and index data 122B. The output data 120A may correspond to the crop image 110.

The output data 122A on the fruit location may be data indicating a region for each fruit of at least one fruit, the region where the fruit is expected to be located in the crop image 110. For example, the output data 122A on the fruit location may be displayed in the form of a bounding box. When displaying the output data 122A in the form of the bounding box, fruit corresponding to the bounding box may be located in an inner area of the bounding box. In addition, an area occupied by the fruit may be smaller than the inner area of the bounding box.

The index data 122B may include at least one piece of data among the labeling data on the ripeness, size, distance, and column of the fruit. The index data 122B may correspond to training data used when training the artificial neural network 220A. The training data may be the training data described above with reference to FIGS. 5 to 8. In other words, when implementing the training data in the form of the fruit information vector, the index data 122B may also be output in the form of the fruit information vector.

In addition, the index data 122B may include a probability value for each labeling data. More specifically, the index data 122B may include a probability value that the fruit is classified into the class of the labeling data on the ripeness, size, distance, and column of the fruit. For example, the index data 122B may include a probability value that the fruit has a ripeness class of 1, a probability value that the fruit has a size class of 1, a probability value that the fruit has a distance class of 1, and a probability value that the fruit has an adjacent column class.

Looking into a specific example, when the index data 122B has the form of the fruit information vector, the index data 122B may have a (fruit location labeling data, fruit ripeness labeling data, fruit size labeling data, fruit distance labeling data, fruit column division labeling data) form. For example, when the index data 122B is output as (X, Y, L, H, 1, 1, 1, 1), (X, Y, L, H) may correspond to the output data 122A on the fruit location. In addition, (1,1,1,1) means that the corresponding fruit has a class labeled with 1 among the fruit ripeness classes, a class labeled with 1 among the fruit size classes, a class labeled with 1 among the fruit distance classes, and a class labeled with 1 among the fruit column division classes. In addition, in this case, the index data 122B may include probability values corresponding to the respective classes.

The control unit may determine the target fruit to be harvested on the basis of the index data. For example, the control unit may determine the target fruit to be harvested based on the fruit ripeness labeling data, which may be differentially determined depending on the season. Hereinafter, a method of determining the target fruit to be harvested depending on the season on the basis of the index data in the control unit will be described.

Figure 11:
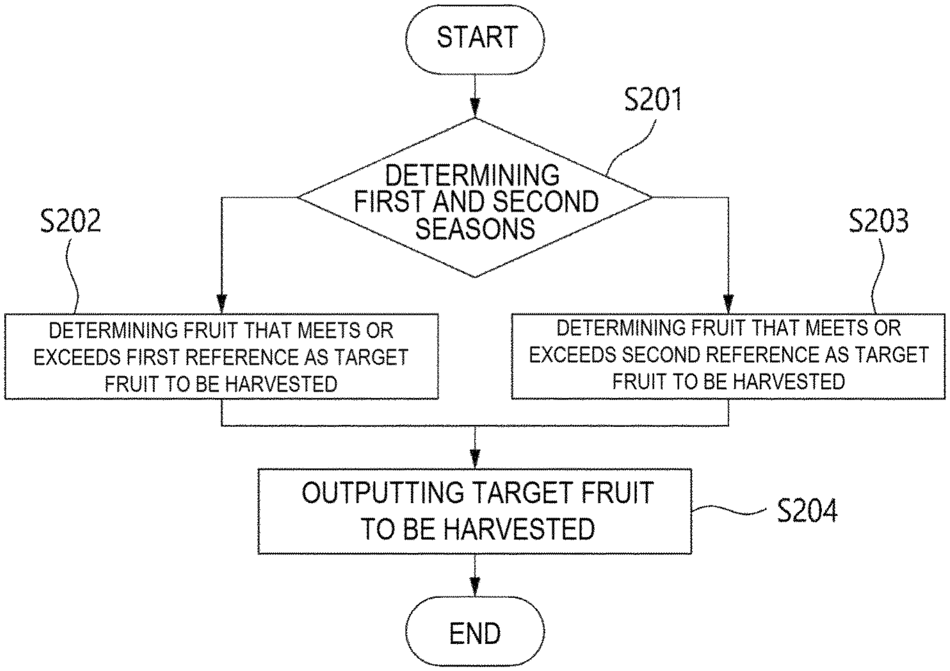
FIG. 11 is a flowchart regarding a method of determining target fruit to be harvested depending on a season according to one embodiment.

FIG. 11 is a flowchart regarding a method of determining the target fruit to be harvested depending on the season according to one embodiment.

The method may include: S201 of determining first and second seasons using the control unit, S202 of determining fruit that meets or exceeds a first reference as the target fruit to be harvested in the first season, S203 of determining fruit that meets or exceeds a second reference as the target fruit to be harvested in the second season, and S204 of outputting the target fruit to be harvested.

The control unit may determine the season in which the fruit is harvested. The season may be a period that is input by the user in advance. More specifically, the season may be related to spring, summer, autumn, and winter. The control unit may determine the season according to the predetermined period set by the user. For example, the season may include the first and second seasons. The first season may be a first period predetermined by the user, and the second season may be a second period predetermined by the user. The first and second periods may include a period of at least one month. In addition, the first and second periods may differ from each other or may partially overlap with each other.

Alternatively, the control unit may determine the season on the basis of the average temperature outside the greenhouse. The control unit may determine the season on the basis of the daily average temperature outside the greenhouse for a predetermined period. For example, the control unit determines the season as the first season when the daily average temperature outside the greenhouse is higher than a reference temperature for a predetermined period, or as the second season when the daily average temperature outside the greenhouse is lower than the reference temperature for a predetermined period. The reference temperature may be a value predetermined by a user. Furthermore, the reference temperature may be a seasonal daily average temperature value in a region where the greenhouse is located. For example, the reference temperature may be a daily average temperature in summer or a daily average temperature in winter, based on the region where the greenhouse is located.

Alternatively, the control unit may compare the daily average temperature outside the greenhouse with a first season reference temperature to determine the first season when the difference falls within a predetermined range. In addition, the control unit may compare the daily average temperature outside the greenhouse with a second season reference temperature to determine the second season when the difference falls within a predetermined range. The first season reference temperature may be higher than the second season reference temperature. The first season may be summer, and the second season may be winter.

In the first season, the control unit may determine the fruit that meets or exceeds the first reference as the target fruit to be harvested. In addition, in the second season, the control unit may determine the fruit that meets or exceeds the second reference as the target fruit to be harvested. The first and second references may be index data on the fruit ripeness output in S201, which will be described in detail with reference to FIG. 12.

FIG. 12 shows the index data on the fruit ripeness according to one embodiment.

Referring to FIG. 12, index data 130 output from the control unit may correspond to one example of index data output from the control unit and may include the fruit ripeness, the labeling data, and output values 140. The index data 130 output from the control unit may be index data for one fruit included in the crop image. As described above with reference to FIG. 5, the fruit ripeness may be classified into two classes, “ripe” and “unripe”. The labeling data may correspond to each class for the fruit ripeness, and the output value 140 may also correspond to each class for the fruit ripeness.

The output value 140 may be a result value based on a probability value. More specifically, the output value 140 may mean a probability value that the fruit corresponding to the output value corresponds to the ripeness class of each fruit corresponding to the output value. Therefore, as shown in FIG. 12, the sum of the output values corresponding to “ripe” and “unripe” may have a value of 1.00.

The control unit may determine the target fruit to be harvested depending on the season on the basis of the output value of the index data. More specifically, the control unit may determine only fruit that meets or exceeds the reference as the target fruit to be harvested by varying the reference depending on the season. For example, as for the fruit corresponding to “ripe” in the first season, the control unit may determine only fruit having an output value higher than the first reference as the target fruit to be harvested. Alternatively, as for the fruit corresponding to “ripe” in the second season, the control unit may determine only fruit having an output value higher than the second reference as the target fruit to be harvested. In this case, the second reference may have a lower value than the first reference. Through this, the control unit may determine only fruit having a higher probability among the fruits corresponding to “ripe” as the target fruit to be harvested in the first season. In addition, the control unit may also determine fruit having a lower probability than that in the first season among the fruits corresponding to “ripe” as the target fruit to be harvested.

The control unit may determine the target fruit to be harvested on the basis of the index data even when classifying the fruit ripeness into at least three classes.

Referring to FIG. 12, when classifying the fruit ripeness into at least three classes, the control unit may output index data 131. The index data 131 may indicate into which of the fruit ripeness classes one fruit, included in the crop image, is classified.

The index data 131 may include the fruit ripeness, the labeling data, and output values. The index data 131 may include the fruit ripeness classified into “first ripeness”, “second ripeness”, and “third ripeness”, the labeling data corresponding to the ripeness, and the output values. The output value of the index data 131 may be a result value based on a probability value. More specifically, the output value may mean a probability value that the fruit corresponding to the output value corresponds to the ripeness class of each fruit corresponding to the output value. Therefore, as shown in FIG. 12, the sum of the output values corresponding to “first ripeness”, “second ripeness”, and “third ripeness” may have a value of 1.00.

Therefore, on the basis of the index data 131, the control unit may determine the ripeness of the fruit corresponding to the index data 131. More specifically, the control unit may determine into which of the ripeness classes the fruit is classified, depending on a predetermined reference threshold value set by the user.

The predetermined reference threshold value may vary depending on the season. More specifically, on the basis of a first reference threshold value, a ripeness class corresponding to an output value greater than the first reference threshold value may be determined as the class for the fruit in the first season. In addition, on the basis of a second reference threshold value, a ripeness class corresponding to an output value greater than the second reference threshold value may be determined as the class for the fruit in the second season.

When the control unit classifies all fruits included in the crop image into the fruit ripeness classes, the control unit may determine only the fruit corresponding to the third ripeness as the target fruit to be harvested. The fruit corresponding to the third ripeness is determined on the basis of a different threshold reference value for each season, so the control unit may differentially determine the target fruit to be harvested depending on the season.

Alternatively, the control unit may determine the target fruit to be harvested differentially depending on the season by varying the ripeness class depending on the season, not by changing the threshold value predetermined by the user.

Specifically, the control unit may determine only the fruit that meets or exceeds the reference as the target fruit to be harvested by changing the class reference depending on the season. For example, in the first season, the control unit may determine only fruit that meets or exceeds the first reference class as the target fruit to be harvested. Alternatively, in the second season, the control unit may determine only fruit that meets or exceeds the second reference class as the target fruit to be harvested. For example, in the first season, only fruit corresponding to “third ripeness” may be determined as the target fruit to be harvested, and in the second season, fruit corresponding to both “third ripeness” and “second ripeness” may be determined as the target fruit to be harvested. In this case, the first reference class may be higher than the second reference class.

As the control unit determines the target fruit to be harvested depending on the season, the harvesting device may harvest fruits that differ in ripeness depending on the harvest season. The control unit may determine the target fruit to be harvested based on different references depending on the season, thereby providing appropriate fruit to consumers in consideration of the degree of ripening during a distribution process. For example, in high-temperature seasons, fruit may ripen more in the distribution process than in low-temperature seasons, so relatively unripe fruit is harvested, and in the low-temperature seasons, relatively ripe fruit is harvested, thereby increasing fruit productivity.

Furthermore, as for the target fruit to be harvested, the harvesting device may harvest the fruit according to the harvest order.

Hereinafter, a detailed description of the harvest order will be described with reference to FIG. 13.

Figure 13:
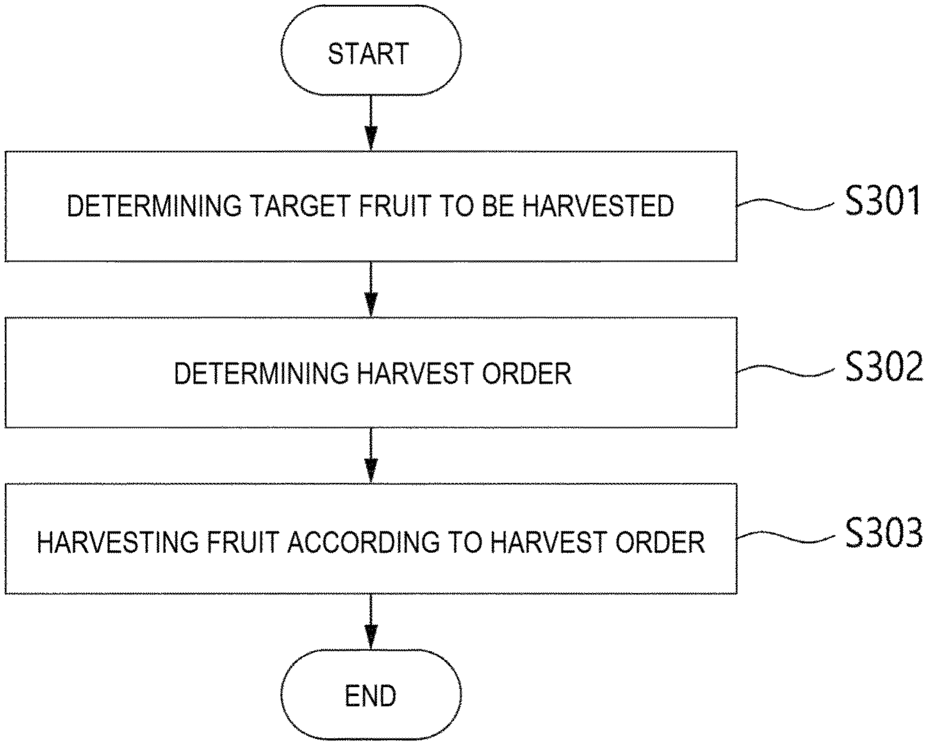
FIG. 13 is a flowchart regarding a method of determining a harvest order according to one embodiment.

FIG. 13 is a flowchart regarding a method of determining the harvest order according to one embodiment.

Referring to FIG. 13, the control unit may determine the harvest order for the target fruit to be harvested. The method of determining the harvest order may include: S301 of determining the target fruit to be harvested, S302 of determining the harvest order, and S303 of harvesting the fruit according to the harvest order.

The determining of the target fruit to be harvested using the control unit has been described above with reference to FIGS. 12 and 13, and thus will be omitted.

The control unit may determine the harvest order for the target fruit to be harvested. The harvest order may be determined on the basis of the index data included in the output data described above with reference to FIG. 9. For example, the index data may include each piece of index data corresponding to the fruit size labeling data and the fruit distance labeling data.

The control unit may determine the harvest order on the basis of the fruit size labeling data in the index data. For example, as for the target fruit to be harvested, the control unit may determine the harvest order to harvest fruit labeled with a fruit size of 2 first, fruit labeled with a fruit size of 1 next, and fruit labeled with a fruit size of 0 last. In addition, the control unit may determine the harvest order to harvest all fruits labeled with a fruit size of 2 first and all fruits labeled with a fruit size of 0 later.

According to another example, the control unit may determine the harvest order on the basis of the fruit distance labeling data in the index data. For example, as for the target fruit to be harvested, the control unit may determine the harvest order to harvest fruit labeled with a fruit distance of 2 first, fruit labeled with a fruit distance of 1 next, and fruit labeled with a fruit distance of 0 last.

The control unit may determine the harvest order for the fruit by using an object detection method. More specifically, the harvesting device may measure the actual distance between the fruit included in the crop and the harvesting device by using the distance sensor described above. On the basis of the actual distance, the control unit may determine the harvest order for the fruit.

That is, the control unit may determine the harvest order on the basis of the actual distance being measured, starting with the fruit positioned at the shortest distance.

In other words, the distance between the fruit and the harvesting device during harvest may be a distance calculated by the artificial neural network or measured using a separate distance sensor.

The control unit may determine the harvest order and the fruit whose harvest is pending according to the harvest order. When determining the harvest order on the basis of the size or distance, the fruit whose harvest is pending may be the fruit whose harvest order is required to be postponed later.

More specifically, when the harvesting device harvest fruit according to the harvest order determined by the control unit, the fruit whose harvest is pending may be fruit whose harvest is yet put on hold due to a harvest reference. For example, in the case where the control unit determines the harvest order on the basis of the fruit size labeling data described above, the fruit labeled with a fruit size of 2 may be set as the fruit whose harvest is pending when the fruit labeled with a fruit size of 0 or 1 is positioned on the movement path of the harvesting device in the process of harvesting the fruit labeled with a fruit size of 2.

Alternatively, when the control unit determines the harvest order such that the fruit in the shortest distance is harvested first, there may be some cases where the harvesting device has physical difficulties in harvest when the fruit is occluded by the fruit positioned at the shortest distance, crop leaves, or other fruits. The control unit may determine the fruit as the fruit whose harvest is pending. In this case, the fruit is harvested regardless of the fruit size, but the control unit may control the harvesting unit so that the fruits are classified according to the size and separately received in the receiving unit. That is, even though the fruit in the shortest distance is harvested first, the control unit is already informed of the information on the fruit size. Thus, on the basis of the information on the fruit size, the fruit may be received in the receiving unit according to the size classification.

The distance may be the actual distance value measured using the distance sensor described above.

Alternatively, the control unit may determine the fruit whose harvest is pending, on the basis of the crop image. More specifically, as described above with reference to FIG. 10, when the artificial neural network included in the control unit receives the crop image and outputs the output data on the fruit location, the fruit whose harvest is pending may be determined on the basis of the output data.

When displaying the output data in the form of a bounding box, the control unit may calculate information on a region of the bounding box overlapping another bounding box. The information on the overlapping region may be the width of the overlapping region. In other words, when implementing the output data in the form of the bounding box, the bounding box may correspond to the fruit location labeling data of the fruit information vector described above. The fruit location labeling data may be implemented as (X, Y, L, H). Using the (X, Y) information and the (L, H) information, the control unit may obtain the width of the overlapping region when at least one bounding box overlaps another bounding box. The larger the width of the overlapping region, the more likely that the control unit determines the fruit corresponding to the overlapping region as the fruit whose harvest is pending. In other words, the fruit having a large region occluded by other fruits may be determined as the fruit whose harvest is pending. In this case, provided that there is a predefined value, the control unit may determine the fruit having a greater area of the occluded region than the predefined value as the fruit whose harvest is pending.

When the control unit determines the fruit whose harvest is pending according to the harvest order, the fruit whose harvest is pending may or may not be determined to be harvested by the control unit. When the control unit determines to harvest the fruit whose harvest is pending, the harvesting device may harvest the fruit whose harvest is pending. In addition, the harvesting device may separately store the fruit whose harvest is pending.

Hereinafter, a method of dividing columns in the greenhouse in a different manner, unlike in the embodiment described above, will be described with reference to FIG. 14.

Figure 14:
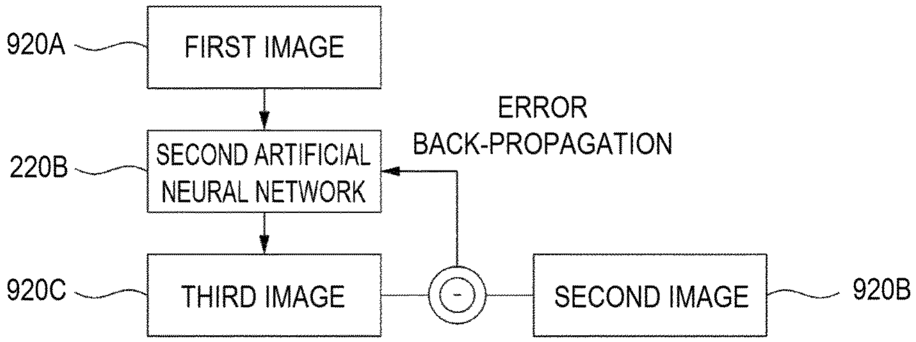
FIG. 14 is a diagram for describing training of a second artificial neural network according to one embodiment.

FIG. 14 is a diagram for describing training of a second artificial neural network according to one embodiment.

Referring to FIG. 14, one example of the training process of the second artificial neural network 220B may be described using a block diagram.

As described above, the training data for training the artificial neural network may include the column labeling data. When inputting the crop image into the artificial neural network, the artificial neural network trained with the training data may output data on the column of fruit included in the crop image.

Unlike this method, according to another embodiment, the column of fruit included in crops may be divided using the second artificial neural network.

As illustrated in FIG. 1, the greenhouse may be a space in which the first-column crop, the second-column crop, and the third-column crop are divided according to columns and grown. In the greenhouse, the harvesting device may move from column to column to determine and harvest the target fruit to be harvested.

When the harvesting device intends to harvest the first-column crop, there may be some cases where the second-column crop and the third-column crop may be unable to be physically harvested. Alternatively, when determining the second-column crop and the third-column crop as the target fruit to be harvested, there may be some cases where the first-column crop may be damaged due to the harvesting operation of the harvesting device. Therefore, when the harvesting device determines the first-column crop as the target fruit to be harvested, the second-column crop and the third-column crop are required not to be determined as the target fruit to be harvested.

To solve this problem, when obtaining the image from the harvesting device, the image including only the first-column crop needs to be obtained. In other words, when an image is obtained for the first-column crop, the second-column crop and the third-column crop included in the image may be recognized as noise, which needs to be removed.

Referring to FIG. 14, the second artificial neural network may be used to solve this problem. The second artificial neural network may perform the functions of the artificial neural network described above with reference to FIG. 3. The second artificial neural network may be implemented using a CNN algorithm but is not to be construed as limited thereto.

When inputting a crop image including all crops grown in the first, second, and third columns, the second artificial neural network may output an image including only the first-column crop.

To this end, the second artificial neural network 220B is required to be trained on the basis of the crop image. More specifically, the second artificial neural network 220B may receive a first image 920A. Then, the second artificial neural network 220B may output a third image 920C, compare the third image 920C with a second image 920B, and thus be trained with the back-propagation from the error therebetween.

The first image 920A and the second image 920B may be obtained by the image-obtaining unit in the harvesting device or may be stored in the storage unit in the harvesting device.

The first image 920A may include all the first-column crop, the second-column crop, and the third-column crop. The second image 920B may include only the first-column crop. The image of the first-column crop included in the first image 920A may be identical to the image of the first-column crop included in the second image 920B.

The third image 920C may be output during the training process of the second artificial neural network 220B. When inputting the first image 920A into the second artificial neural network, the third image 920C may be output after the second-column crop and the third-column crop, except for the first-column crop, in the first image 920A are recognized as noise and then removed. The second artificial neural network 220B may be trained by comparing differences between the third image 920C and the second image 920B.

Hereinafter, a process of obtaining the first image 920A and the second image 920B will be described in detail with reference to FIG. 15.

Figure 15:
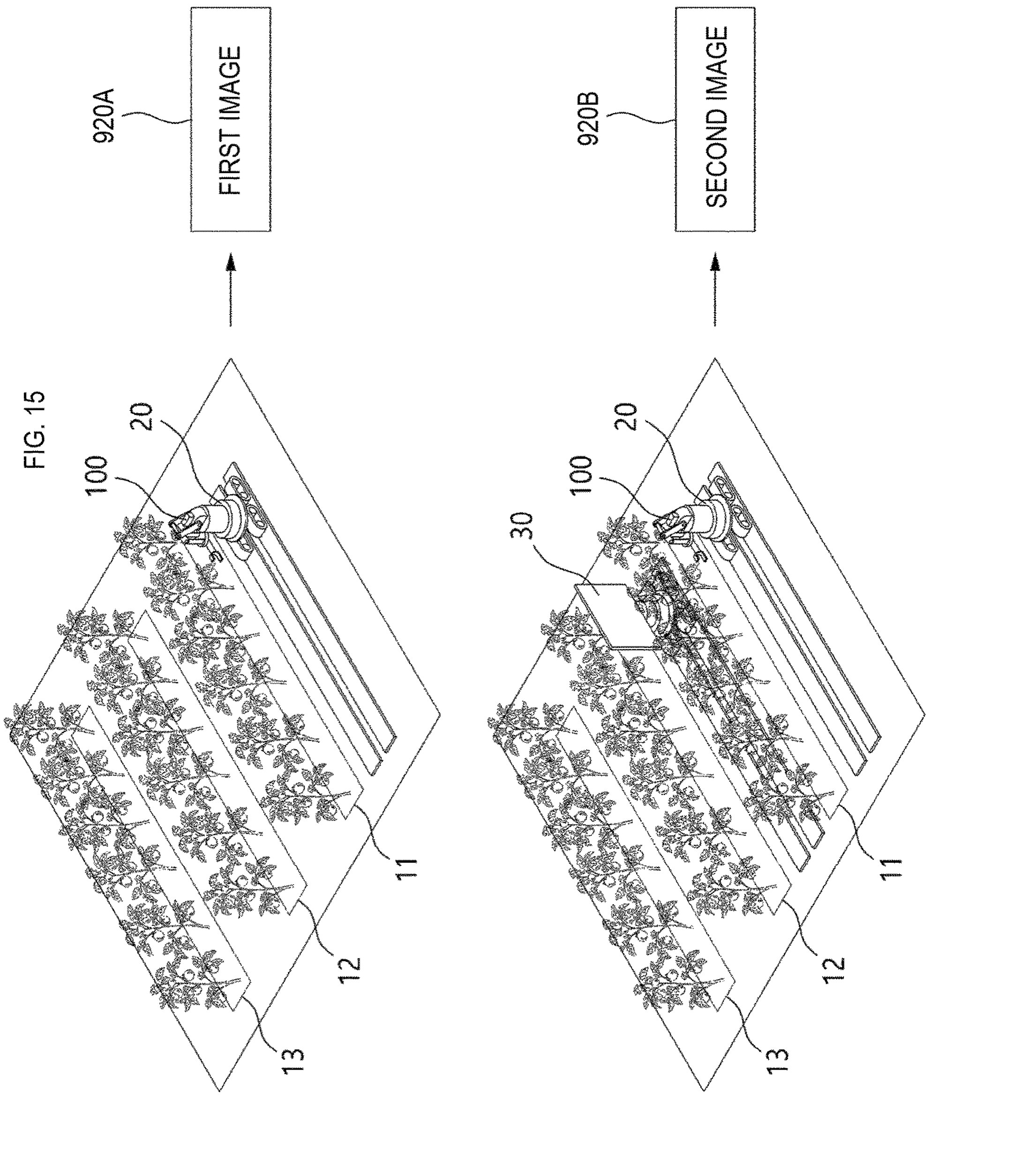
FIG. 15 is a diagram regarding obtaining of first and second images according to one embodiment.

FIG. 15 a diagram regarding the obtaining of the first and second images according to one embodiment.

The harvesting device 20 may obtain the first image 920A and the second image 920B. The image-obtaining unit 100 in the harvesting device 20 may obtain the first image 920A and the second image 920B. The harvesting device 20 may obtain the first image 920A and the second image 920B while moving at a constant speed on a rail installed in the greenhouse.

The first image 920A may include the first-column crop 11 adjacent to the harvesting device 20 as well as the second-column crop 12 and the third-column crop 13 that are spaced from the harvesting device.

The second image 920B may include only the first-column crop 11 adjacent to the harvesting device 20. The respective first-column crops 11 included in the first image 920A and the second image 920B may be identical.

The second image 920B may be obtained by the harvesting device 20 after installing the blackout device 30 in the greenhouse. The blackout device 30 may be installed between the first-column crop 11 and the second-column crop 12. The blackout device 30 may move at a constant speed along a rail installed between the first-column crop 11 and the second-column crop 12. When the harvesting device 20 obtains the second image 920B, the blackout device 30 may perform the function of covering the second-column crop 12 and the third-column crop 13.

The blackout device 30 may move within the greenhouse while in a synchronized state with the harvesting device 20. The synchronized state may mean that the blackout device 30 and the harvesting device 20 move within the greenhouse at the same speed while maintaining a uniform distance.

The blackout device 30 corresponds to one embodiment. Any type of device that performs the function of covering the first-column crop 11, the second-column crop 12, and the third-column crop 13 when the harvesting device 20 obtains the image in the greenhouse may be included.

The harvesting device 20 may calculate the distance between the crop and the harvesting device 20 using the stereoscopic camera as well as the technical method described above with reference to FIGS. 9 and 10. More specifically, the harvesting device may obtain a plurality of crop images, including the first image 920A and the second image 920B, by using the stereoscopic camera. In addition, the obtained images may be used to train the second artificial neural network.

Hereinafter, another method of obtaining the actual distance between the harvesting device and the crop in the greenhouse will be described.

Figure 16:
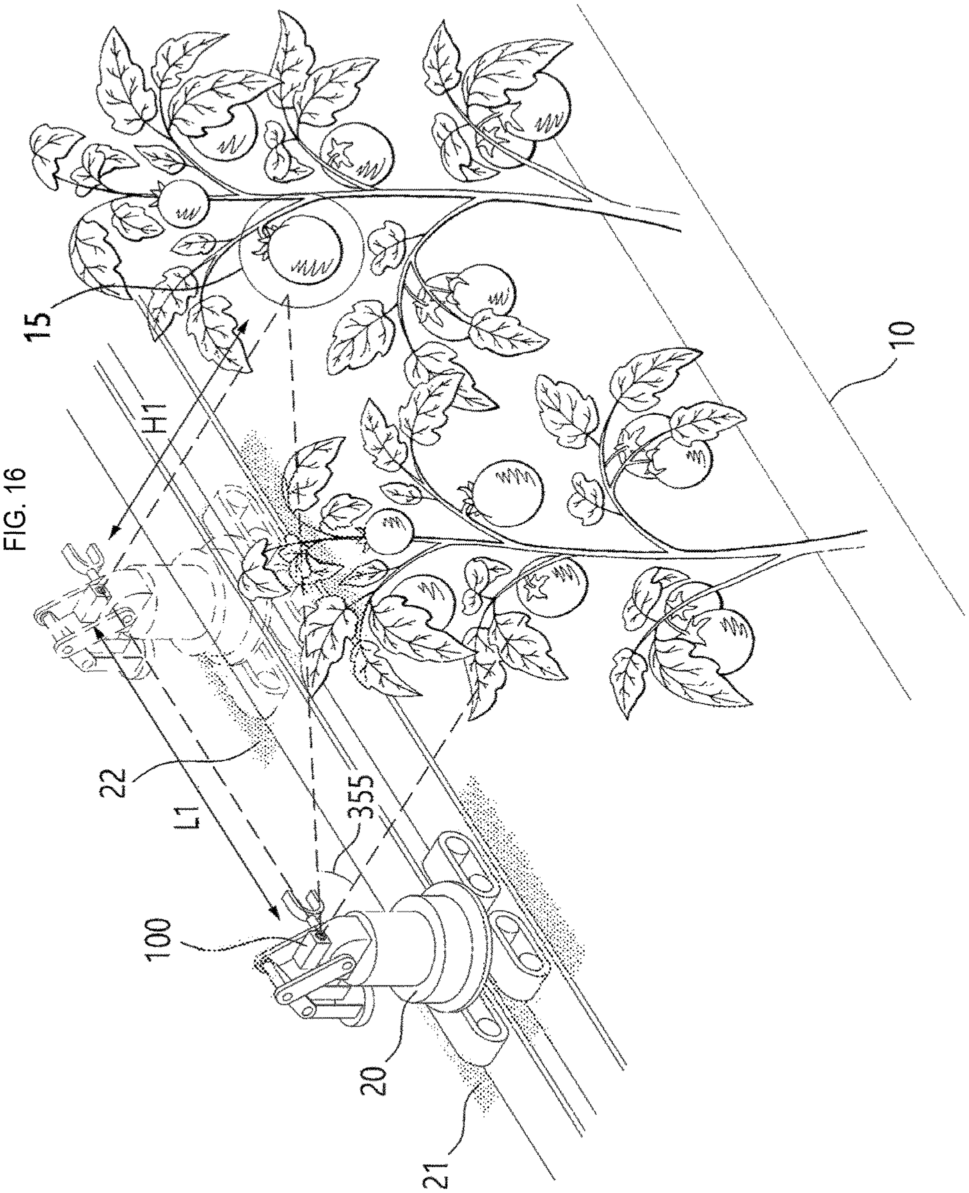
FIG. 16 is a diagram for describing a method of obtaining a distance from a harvesting device to a crop according to one embodiment.

FIG. 16 is a diagram for describing a method of obtaining the distance from the harvesting device to the crop according to one embodiment.

Referring to FIG. 16, the method of obtaining a straight-line distance between fruit 15 and the harvesting device 20 may be described.

The harvesting device 20 may move while maintaining a constant speed within the greenhouse and may obtain the image of the crop 10 while moving. The image-obtaining unit 100 in the harvesting device 20 may obtain the image of the crop 10 while moving at a constant speed. The crop image may include the fruit 15.

The harvesting device 20 may obtain the image of the fruit 15 when being located in a first region 21 at a first time point. In addition, the harvesting device 20 may move to a second region 22 while time elapses from the first time point to a second time point. While moving, the image including the fruit 15 may be obtained. The second region 22 may overlap a virtual line connecting the center of the image-obtaining unit 100 in the harvesting device 20 and a control point of the fruit 15.

When the harvesting device 20 moves at a constant speed while being located in the second region 22 at the second time point, a time difference from the first time point to the second time point may be T1. In this case, the harvesting device 20 moves at a constant speed, so L1, which is a moving distance of the harvesting device from the first region 21 to the second region 22, may be obtained. In other words, L1 may be the distance that the harvesting device 20 moves from the first region 21 to the second region 22.

In this case, an angle 355 between the image-obtaining unit 100 in the harvesting device and the fruit 15 may be obtained. More specifically, the angle 355 may be an angle between a virtual line connecting the central point of the image-obtaining unit 100 and the fruit 15 at a straight line distance and a straight virtual line connected from the central point of the image-obtaining unit 100 toward the front surface of the image-obtaining unit 100.

Using the distance value, L1, and the angle 355, H1, which is a distance between the harvesting device 20 and the fruit 15, may be obtained. More specifically, H1 may be obtained using a tangent function (tan function).

Using H1, the distance between the harvesting device 20 and the fruit 15, the control unit in the harvesting device 20 may determine the harvest order. The harvest order may be one of the harvest orders described above with reference to FIG. 13.

Unlike the method described above, the distance between the crop and the harvesting device may be calculated using an additional device, such as a distance sensor. For example, using a distance sensor or a 3D depth camera, the harvesting device may directly obtain the actual distance between the harvesting device and the crop without involving the method described above. Any type of distance sensor that performs the function of obtaining a distance to an object may be included.

Figure 17:
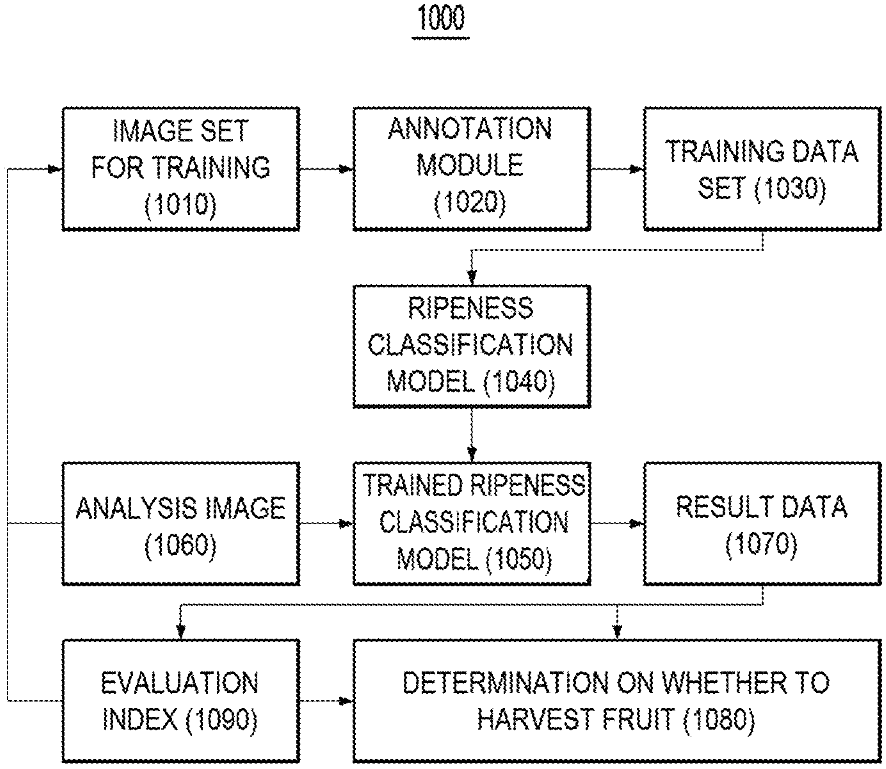
FIG. 17 is a diagram for describing a machine learning operation system according to one embodiment.

FIG. 17 is a diagram for describing a machine learning operation system according to one embodiment.

Referring to FIG. 17, the machine learning operation system 1000, according to one embodiment, may include a training data preparation system, a model training system, an analysis and prediction system using a training model, a model evaluation system, and the like, but is not limited thereto.

The training data preparation system, according to one embodiment, may be configured to obtain an image set 1010 for training and generate a training data set 1030 with the image set 1010 for training.

For example, the training data preparation system, according to one embodiment, may be configured to generate the training data set 1030 including labeling data for the image set 1010 for training.

In this case, the labeling data may mean result data for training for at least one feature included in the image set 1010 for training.

For example, the labeling data may be the ripeness data for a feature corresponding to fruit included in the image set 1010 for training, but is not limited thereto.

To generate the training data set 1030 with the image set 1010 for training, human determinations are typically involved.

For example, a person may visually classify at least one feature included in the image set 1010 for training to generate labeling data.

For a more specific example, a person may determine whether a feature corresponding to the fruit included in the image set 1010 for training is included in class 1 (ripe), class 2 (ripening), or class 3 (unripe) to generate labeling data.

However, generating the training data set 1030 with the image set 1010 for training based entirely on human determinations, as described above, may require time and costs. In particular, the increasing number of image sets 1010 for training may require more time and costs.

Therefore, the training data preparation system, according to one embodiment, may include an annotation module 1020 configured to obtain labeling data or pseudo-labeling data for the image set 1010 for training.

In this case, the pseudo-labeling data may refer to primary labeling data provided to help a person determine or offer a guide for at least one feature included in the image set 1010 for training, but not limited thereto.

As described above, when the training data preparation system, according to one embodiment, includes the annotation module 1020 configured to obtain the labeling data or pseudo-labeling data for the image set 1010 for training, time and costs required for human determinations may be reduced. In addition, a further clear determination reference within a range that is ambiguous for humans to determine may be presented to improve the accuracy of the final analysis or prediction model.

The training data preparation system including the annotation module 1020, according to one embodiment, will be described in more detail below with reference to FIGS. 18 and 19.

Referring back to FIG. 17, the model training system included in the machine learning operation system 1000, according to one embodiment, may be configured to train a designed artificial intelligence model with the generated training data set 1030.

In this case, as illustrated in FIG. 17, the designed artificial intelligence model may include a ripeness classification model 1040 but is not limited thereto. The designed artificial intelligence model may include various models, such as a ripeness determination model, a ripeness calculation model, a determination model on whether to harvest fruit, and the like.

In addition, the designed artificial intelligence model may include at least one artificial neural network (ANN).

For example, the designed artificial intelligence model may include at least one artificial neural network among various artificial intelligence networks, such as a feedforward neural network, a radial basis function network, Kohonen's self-organizing network, a deep neural network (DNN), a convolutional neural network (CNN), a recurrent neural network (RNN), a long short-term memory network (LSTM), or gated recurrent units (GRUs), but is not limited thereto.

In addition, the at least one artificial neural network included in the designed artificial intelligence model may use the same or different activation function.

In this case, the activation function may include a sigmoid function, a hyperbolic tangent function (tanh function), a rectified linear unit function (ReLU function), a leaky ReLU function, an exponential linear unit function (ELU function), a softmax function, and the like, but is not limited thereto. The activation function may include various activation functions (including custom activation functions) for outputting result values or transmitting the same to other artificial neural networks.

In addition, the model training system, according to one embodiment, may use at least one loss function to train the designed artificial intelligence model.

In this case, the at least one loss function may include mean squared error (MSE), root mean squared error (RMSE), binary cross-entropy, categorical cross-entropy, sparse categorical cross-entropy, and the like, but is not limited thereto. The at least one loss function may include various functions (including custom loss functions) for calculating a difference between the predicted result value and the actual result value.

In addition, the model training system, according to one embodiment, may use at least one optimizer to train the designed artificial intelligence model.

In this case, the optimizer may be used to update a relation parameter between an input value and a result value.

In this case, the at least one optimizer may include Gradient descent, Batch Gradient Descent, Stochastic Gradient Descent, Mini-batch Gradient Descent, Momentum, AdaGrad, RMSProp, AdaDelta, Adam, NAG, NAdam, RAdam, AdamW, and the like, but is not limited thereto.

In addition, the designed artificial intelligence model may be trained in the model training system according to one embodiment. In addition, the trained artificial intelligence model may be used in the analysis and prediction system included in the machine learning operation system 1000.

In this case, as illustrated in FIG. 17, the trained artificial intelligence model may include a trained ripeness classification model 1050, but is not limited thereto. The trained artificial intelligence model may include various models, such as a trained ripeness determination model, a trained ripeness calculation model, a trained determination model on whether to harvest fruit, and the like.

The analysis and prediction system, according to one embodiment, may output result data 1070 from an analysis image 1060 obtained using the trained artificial intelligence model.

In this case, the analysis image 1060 may include the image obtained from the image-obtaining device, but is not limited thereto. The analysis image 1060 may include an image regarding at least one feature extracted from the image obtained from the image-obtaining device.

For example, the analysis image 1060 may include a fruit image extracted from the crop image obtained by the image-obtaining device, but is not limited thereto.

In addition, the result data 1070 may include classification data for the analysis image 1060.

For example, the result data 1070 may include classification data for the analysis images 1060 into ripe, ripening, and unripe classes, but is not limited thereto.

In addition, the result data 1070 may include classification score data for the analysis image 1060.

For example, the result data 1070 may include classification score data for the analysis images 1060, such as ripeness, ripening, and unripe scores, but is not limited thereto.

In this case, the classification score data may mean a probability value of falling within each class.

For example, the classification score data may mean a probability value of falling within the ripe, ripening, or unripe class, but is not limited thereto.

In addition, the classification score data may be output so that the sum becomes 1. For example, when setting the final activation function for prediction as the softmax function, the sum of the probability values of falling within the ripe, ripening, and unripe classes may be 1, but is not limited thereto.

In addition, the result data 1070 may be used in the determination system on whether to harvest fruit or the evaluation system, included in the machine learning operation system 1000.

The determination system on whether to harvest fruit, according to one embodiment, may determine whether to harvest fruit, using the result data 1070 output from the analysis and prediction system.

For example, the determination system on whether to harvest fruit, according to one embodiment, may determine whether to harvest fruit on the basis of the classification data of the result data 1070 output from the analysis and prediction system.

For a more specific example, the determination system on whether to harvest fruit, according to one embodiment, may determine whether to harvest only fruit whose result data 1070 output from the analysis and prediction system has the classification data falling within the ripe class.

In addition, for example, the determination system on whether to harvest fruit, according to one embodiment, may determine whether to harvest fruit on the basis of the classification score data of the result data 1070 output from the analysis and prediction system.

For a more specific example, the determination system on whether to harvest fruit, according to one embodiment, may determine to harvest only fruit whose result data 1070 output from the analysis and prediction system has the classification score data that meets or exceeds a reference value, but is not limited thereto.

In this case, the reference value for the classification score data may vary depending on various factors.

For example, the reference value for the classification score data may vary depending on season information, demand forecast information, weather forecast information, distribution network-related information, and the like, but is not limited thereto.

In addition, for example, the determination system on whether to harvest fruit, according to one embodiment, may determine whether to harvest fruit on the basis of the classification data and the classification score data of the result data 1070 output from the analysis and prediction system.

For a more specific example, the determination system on whether to harvest fruit, according to one embodiment, may determine to harvest only fruit whose result data 1070 output from the analysis and prediction system has the classification data falling within the ripe and the classification score data that meets or exceeds a reference value, but is not limited thereto.

In this case, the reference value for the classification score data may vary depending on various factors.

For example, the reference value for the classification score data may vary depending on season information, demand forecast information, weather forecast information, distribution network-related information, and the like, but is not limited thereto.

The evaluation system, according to one embodiment, may be configured to evaluate the result data 1070.

For example, the evaluation system, according to one embodiment, may be configured to calculate an evaluation index for the result data 1070 on the basis of uncertainty calculated on the basis of the result data 1070, but is not limited thereto.

In this case, the uncertainty may be calculated on the basis of the classification score data for each class included in the result data 1070.

For example, the uncertainty may be calculated by the following entropy calculation equation.

$$Entropy H(X) = -\sum_{i=1}^{n} P(x_i)\log P(x_i)$$

In this case, P(xi) may mean the classification score data for each class but is not limited thereto.

In addition, an evaluation index 1090 for the result data 1070 may be calculated on the basis of the uncertainty or entropy described above.

In addition, in the machine learning operation system 1000 according to one embodiment, the evaluation index 1090 may be used in the determination system on whether to harvest fruit.

The determination system on whether to harvest fruit, according to one embodiment, may determine whether to harvest fruit, using the result data 1070 output from the analysis and prediction system and the evaluation index 1090 output from the evaluation system.

For example, the determination system on whether to harvest fruit, according to one embodiment, may determine whether to harvest fruit on the basis of the classification data of the result data 1070 output from the analysis and prediction system and the evaluation index 1090 output from the evaluation system.

For a more specific example, the determination system on whether to harvest fruit, according to one embodiment, may determine to harvest only fruit whose result data 1070 output from the analysis and prediction system has the classification data falling within the ripe and the evaluation index 1090 that meets or exceeds a reference value, but is not limited thereto.

In this case, the reference value for the evaluation index 1090 may vary depending on various factors.

For example, the reference value for the evaluation index 1090 may vary depending on season information, demand forecast information, weather forecast information, distribution network-related information, and the like, but is not limited thereto.

In addition, in the machine learning operation system 1000 according to one embodiment, the evaluation index 1090 may be used as an index for obtaining a new image set for training.

For example, when the evaluation index 1090 exceeds the reference value, this may mean that the uncertainty value for the result data 1070 output from the analysis and prediction system is high. Thus, when the evaluation index 1090 exceeds the reference value, the analysis image 1060 may be included in the new image set for training, but is not limited thereto.

In addition, the machine learning operation system 1000, according to one embodiment, may generate a new training data set on the basis of the new image set for training, and may allow the designed artificial intelligence model to be retrained or further trained on the basis of the new training data set generated.

Furthermore, the machine learning operation system 1000, according to one embodiment, may distribute or redistribute a new version of the artificial intelligence model being retrained or further trained to manage the version of the trained artificial intelligence model.

Hereinafter, the annotation module, according to one embodiment, will be described in more detail.

Figure 18:
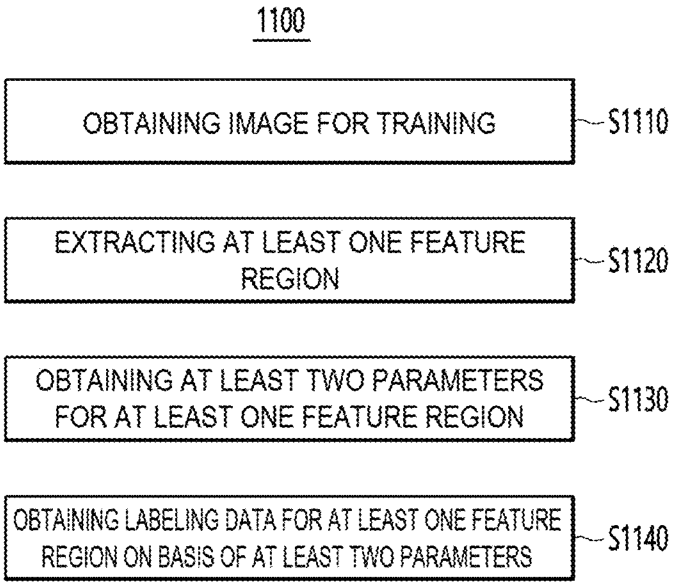
FIG. 18 is a flowchart illustrating a method of operating an annotation module according to one embodiment.
Figure 19:
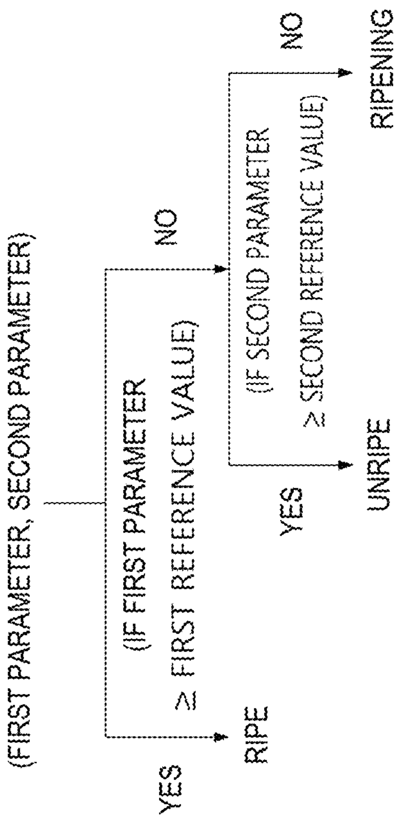
FIG. 19 is a diagram for further specifically describing an annotation module according to one embodiment.

FIG. 18 is a flowchart illustrating a method of operating the annotation module according to one embodiment, and FIG. 19 is a diagram for further specifically describing the annotation module according to one embodiment.

Referring to FIG. 18, a method 1100 of operating the annotation module, according to one embodiment, may include at least one among: S1110 of obtaining an image for training, S1120 of extracting at least one feature region, S1130 of obtaining at least two parameters for the at least one feature region, and S1140 of obtaining labeling data for the at least one feature region on the basis of the at least two parameters.

The obtaining S1110 of the image for training, according to one embodiment, may include loading the image for training located in a specific path in a computer, but is not limited thereto.

In addition, the obtaining S1110 of the image for training, according to one embodiment, may include loading the image for training stored in a specific server, but is not limited thereto.

In addition, the obtaining S1110 of the image for training, according to one embodiment, may include loading the image for training stored in the cloud and the like, but is not limited thereto.

The contents described with reference to FIG. 4 and the like may be applied to the extracting S1120 of the at least one feature region according to one embodiment, so redundant descriptions will be omitted.

In addition, in the extracting S1120 of the at least one feature region according to one embodiment, technology for extracting the feature region, such as an algorithm, machine learning, deep learning, and the like, may be used, but is not limited thereto.

In the obtaining S1130 of the at least two parameters for the at least one feature region according to one embodiment, the at least two parameters may be related to at least two colors.

For example, when the at least two parameters include first and second parameters, the first parameter may be related to a first color, and the second parameter may be related to a second color.

For a more specific example, when the at least two parameters include the first and second parameters, the first parameter may be related to the first color, corresponding to the ripe state of the target fruit. In addition, the second parameter may be related to the second color, corresponding to the unripe state of the target fruit. However, the first and second parameters are not limited thereto.

For example, when the target fruit is a tomato, the first parameter may be related to red, corresponding to the ripe state of the tomato. In addition, the second parameter may be related to green, corresponding to the unripe state of the tomato. However, the first and second parameters are not limited thereto.

In the obtaining S1130 of the at least two parameters for the at least one feature region according to one embodiment, at least two color ranges may be used to obtain the at least two parameters.

In this case, the color range may be expressed as a range of color channel values or a range of pixel values.

For example, when the at least two parameters include the first and second parameters, the first parameter may be calculated on the basis of the number of pixels whose pixel value (for example, an RGB value) falls within a first color range among pixels included in the at least one feature region. In addition, the second parameter may be calculated on the basis of the number of pixels whose pixel value (for example, an RGB value) falls within a second color range among the pixels included in the at least one feature region. However, the first and second parameters are not limited thereto.

In this case, the first color range may be related to the ripe state of the target fruit, and the second color range may be related to the unripe state of the target fruit.

For example, when the target fruit is a tomato, the first color range may be a red range, corresponding to the ripe state of the tomato, and the second color range may be a green range, corresponding to the unripe state of the tomato. However, the first and second color ranges are not limited thereto.

In addition, in the obtaining S1130 of the at least two parameters for the at least one feature region according to one embodiment, the at least two parameters may be calculated on the basis of the number of pixels included in the at least one feature region and the number of pixels whose pixel value falls within the respective color ranges.

For example, the first parameter may be calculated on the basis of the number of pixels included in the at least one feature region and the number of pixels whose pixel value (for example, an RGB value) falls within the first color range among the pixels included in the at least one feature region. In addition, the second parameter may be calculated on the basis of the number of pixels included in the at least one feature region and the number of pixels whose pixel value (for example, an RGB value) falls within the second color range among the pixels included in the at least one feature region. However, the first and second parameters are not limited thereto.

In the obtaining S1130 of the at least two parameters for the at least one feature region according to one embodiment, when the at least two parameters include three parameters, the three parameters may be related to three colors, respectively.

For example, when the at least two parameters include first, second, and third parameters, the first parameter may be related to a first color, and the second parameter may be related to a second color.

For a more specific example, when the at least two parameters include the first, second, and third parameters, the first parameter may be related to the first color, corresponding to the ripe state of the target fruit. In addition, the second parameter may be related to the second color, corresponding to the unripe state of the target fruit. Furthermore, the third parameter may be related to a third color, corresponding to the ripening state of the target fruit. However, the first, second, and third parameters are not limited thereto.

For example, when the target fruit is a tomato, the first parameter may be related to red, corresponding to the ripe state of the tomato. In addition, the second parameter may be related to green, corresponding to the unripe state of the tomato. Furthermore, the third parameter may be related to orange, corresponding to the ripening state of the tomato. However, the first, second, and third parameters are not limited thereto.

In the obtaining S1130 of the at least two parameters for the at least one feature region according to one embodiment, when the at least two parameters include three parameters, three color ranges may be used to obtain the three parameters.

In this case, the color range may be expressed as a range of color channel values or a range of pixel values.

For example, when the at least two parameters include the first, second, and third parameters, the first parameter may be calculated on the basis of the number of pixels whose pixel value (for example, an RGB value) falls within a first color range among pixels included in the at least one feature region. In addition, the second parameter may be calculated on the basis of the number of pixels whose pixel value (for example, an RGB value) falls within a second color range among the pixels included in the at least one feature region. In addition, the third parameter may be calculated on the basis of the number of pixels whose pixel value (for example, an RGB value) falls within a third color range among the pixels included in the at least one feature region. However, the first, second, and third parameters are not limited thereto.

In this case, the first color range may be related to the ripe state of the target fruit, the second color range may be related to the unripe state of the target fruit, and the third color range may be related to the ripening state of the target fruit.

For example, when the target fruit is a tomato, the first color range may be a red range, corresponding to the ripe state of the tomato. In addition, the second color range may be a green range, corresponding to the unripe state of the tomato. Furthermore, the third color range may be an orange range, corresponding to the ripening state of the tomato. However, the first, second, and third color ranges are not limited thereto.

In addition, in the obtaining S1130 of the at least two parameters for the at least one feature region according to one embodiment, when the at least two parameters include three parameters, the three parameters may be calculated on the basis of the number of pixels included in the at least one feature region and the number of pixels whose pixel value falls within the respective color ranges.

For example, the first parameter may be calculated on the basis of the number of pixels included in the at least one feature region and the number of pixels whose pixel value (for example, an RGB value) falls within the first color range among the pixels included in the at least one feature region. In addition, the second parameter may be calculated on the basis of the number of pixels included in the at least one feature region and the number of pixels whose pixel value (for example, an RGB value) falls within the second color range among the pixels included in the at least one feature region. Furthermore, the third parameter may be calculated on the basis of the number of pixels included in the at least one feature region and the number of pixels whose pixel value (for example, an RGB value) falls within the third color range among the pixels included in the at least one feature region. However, the first, second, and third parameters are not limited thereto.

In addition, although the above contents have been described on the basis of two or three parameters, the at least two parameters, according to one embodiment, are not limited to the above examples and may include various numbers of parameters, such as four or five. In this case, the contents described above may be similarly applied.

The obtaining S1140 of the labeling data for the at least one feature region on the basis of the at least two parameters will be described on the basis of one embodiment in which the labeling data is obtained on the basis of two parameters. This will be described in more detail with reference to FIG. 19.

In addition, in this specification, although described on the basis of one embodiment in which the labeling data is obtained on the basis of two parameters, the content of the present disclosure is not limited to the corresponding embodiment. As described above, contents in which the labeling data is obtained on the basis of various numbers of parameters, such as three, four, or five may also be included. In addition, such contents may be sufficiently described on the basis of the content to be described below, so redundant descriptions will be omitted.

Referring to FIG. 19, the obtaining S1140 of the labeling data for the at least one feature region on the basis of the at least two parameters may include: comparing the first parameter with a first reference value, and comparing the second parameter with a second reference value.

For example, as illustrated in FIG. 19, the comparing of the first parameter with the first reference value may include: labeling the at least one feature region as a first class when the first parameter is greater than or equal to the first reference value; and comparing the second parameter with the second reference value when the first parameter is less than the first reference value, but is not limited thereto.

In addition, for example, as illustrated in FIG. 19, the comparing of the second parameter with the second reference value may include: labeling the at least one feature region as a second class when the second parameter is greater than or equal to the second reference value; and labeling the at least one feature region as a third class when the second parameter is less than the second reference value, but is not limited thereto.

In this case, as illustrated in FIG. 19, the first class may be related to the ripe state, the second class may be related to the unripe state, and the third class may be related to the ripening state.

In addition, unlike the example illustrated in FIG. 19, the obtaining S1140 of the labeling data for the at least one feature region on the basis of the at least two parameters may include: comparing the first parameter with the first reference value; and comparing the second parameter with the second reference value.

For example, the comparing of the second parameter with the second reference value may include: labeling the at least one feature region as the second class when the second parameter is greater than or equal to the second reference value; and comparing the first parameter with the first reference value when the second parameter is less than the second reference value, but is not limited thereto.

In addition, for example, the comparing of the first parameter with the first reference value may include: labeling the at least one feature region as the first class when the first parameter is greater than or equal to the first reference value; and labeling the at least one feature region as the third class when the first parameter is less than the first reference value, but is not limited thereto.

As described with reference to FIG. 19, the obtaining S1140 of the labeling data for the at least one feature region on the basis of the at least two parameters may use a decision tree in which the labeling data is determined on the basis of the reference values for the obtained parameters, but is not limited thereto.

In addition, the first and second reference values may be the same but are not limited thereto, and may differ from each other.

The reference for determining the ripeness state of fruit or fruit harvest may vary according to policy references.

This means that the state of fruit that needs to be harvested may vary depending on harvest season, season, demands, weather, length of distribution network, and the like. For example, in the case of seasons with high average temperatures where the state of fruit changes to a further ripe state during distribution, starting harvest from less ripe fruit is desirable, compared to the case of seasons with low average temperatures.

Therefore, a decision tree structure or reference value used in the obtaining of the labeling data for the at least one feature region, described above, preferably varies depending on the harvest season of fruit, season, demands, weather, length of distribution network, and the like.

For example, the first reference value in the case of seasons with high average temperatures where the state of fruit changes to a further ripe state during distribution may be set to be lower than that in the case of seasons with low average temperatures.

Therefore, in the obtaining of the labeling data for the at least one feature region, different annotation modules with different decision tree structures or reference values may be used to generate different training data sets, thereby obtaining different versions of trained artificial intelligence models, which may be a flexible way to cope with policy determination on fruit harvest.

Hereinafter, a machine learning operation system that secures different versions of the trained artificial intelligence models using different annotation modules will be described.

Figure 20:
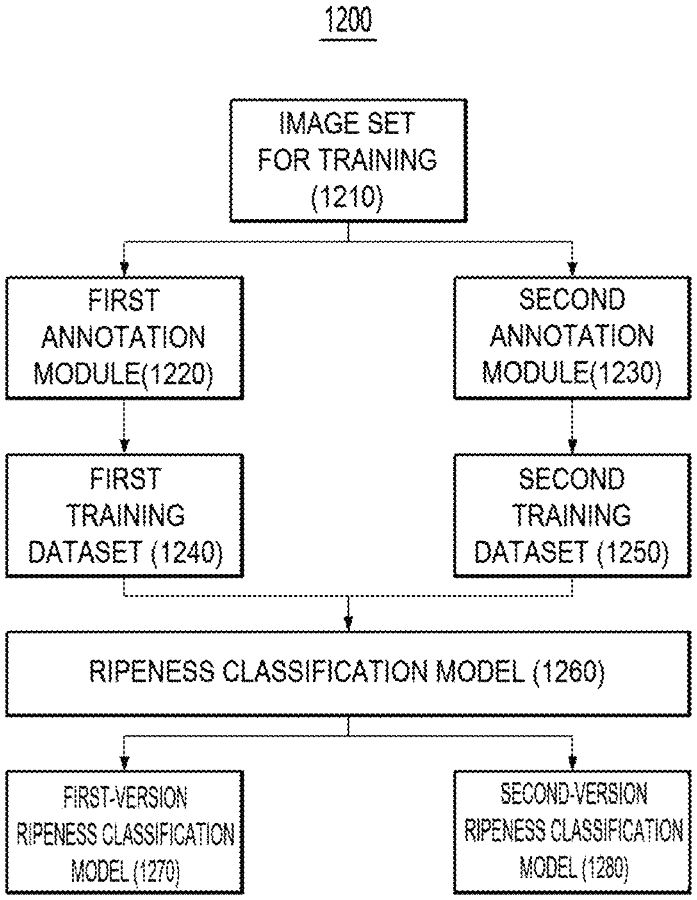
FIG. 20 is a diagram for describing a machine learning operation system according to one embodiment.

FIG. 20 is a diagram for describing the machine learning operation system according to one embodiment.

Referring to FIG. 20, the machine learning operation system 1200, according to one embodiment, may include a training data preparation system, a model training system, an analysis and prediction system using a training model, a model evaluation system, and the like, but is not limited thereto.

In this case, the contents described with reference to FIG. 17 may be applied to the machine learning operation system 1200, so redundant descriptions will be omitted.

Referring to FIG. 20, the training data preparation system, according to one embodiment, may include a first annotation module 1220 and a second annotation module 1230.

In this case, the first annotation module 1220 and the second annotation module 1230 may differ from each other.

For example, the first annotation module 1220 and the second annotation module may differ from each other in reference value but are not limited thereto.

In addition, for example, the first annotation module 1220 and the second annotation module may differ from each other in decision tree structure but are not limited thereto.

In addition, referring to FIG. 20, the training data preparation system, according to one embodiment, may obtain a first training data set 1240 from an image set 1210 for training using the first annotation module 1220 and a second training data set 1250 from the image set 1210 for training using the second annotation module 1230.

However, although the image set 1210 for training configured to obtain the first training data set 1240 and the second training data set 1250 is indicated as identical in FIG. 20, the image set for training configured to obtain the respective training data sets may differ from each other.

In addition, referring to FIG. 20, the model training system, according to one embodiment, may generate different versions of the trained artificial intelligence models using different types of training data.

For example, referring to FIG. 20, the model training system, according to one embodiment, may generate a first-version ripeness classification model 1270 using the first training data set 1240 and a second-version ripeness classification model 1280 using the second training data set 1250, but is not limited thereto.

In this case, the first-version ripeness classification model 1270 and the second-version ripeness classification model 1280 may be used in the analysis and prediction system at different time points.

For example, the first-version ripeness classification model 1270 may be used in the analysis and prediction system in a first season, and the second-version ripeness classification model 1280 may be used in the analysis and prediction system in a second season. However, the first-version and second-version ripeness classification models are not limited thereto.

In addition, for example, the first-version ripeness classification model 1270 may be used in the analysis and prediction system when the demand prediction information falls within a first range, and the second-version ripeness classification model 1280 may be used in the analysis and prediction system demand when the demand prediction information falls within a second range. However, the first-version and second-version ripeness classification models are not limited thereto.

In addition, for example, the first-version ripeness classification model 1270 may be used in the analysis and prediction system when a temperature falls within a first range, and the second-version ripeness classification model 1280 may be used in the analysis and prediction systems when a temperature falls within a second range. However, the first-version and second-version ripeness classification models are not limited thereto.

In addition, for example, the first-version ripeness classification model 1270 may be used in the analysis and prediction systems for the fruit using a distribution network having a first distribution period. In addition, the second-version ripeness classification model 1280 may be used in the analysis and prediction systems for the fruit using a distribution network having a second distribution period. However, the ripeness classification models are not limited thereto.

Hereinafter, the determination system on whether to harvest fruit depending on various conditions will be described in more detail.

Figure 21:
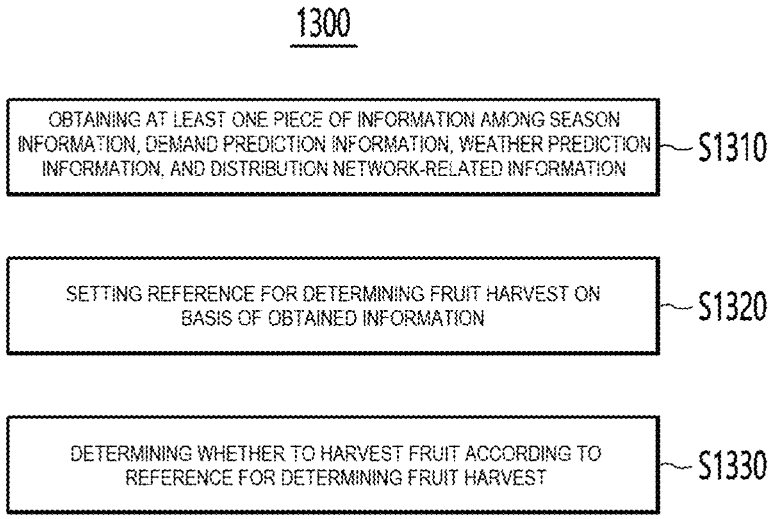
FIG. 21 is a flowchart for describing a method of operating a determination system of whether to harvest fruit according to one embodiment.

FIG. 21 is a flowchart for describing a method of operating the determination system of whether to harvest fruit according to one embodiment.

Referring to FIG. 21, a method 1300 of operating the determination system on whether to harvest fruit, according to one embodiment, may include at least one among: S1310 of obtaining at least one piece of information among season information, demand prediction information, weather prediction information, and distribution network-related information, S1320 of setting a reference for determining fruit harvest on the basis of the obtained information, and S1330 of determining whether to harvest fruit according to the reference for determining fruit harvest.

In addition, the content of the determination system on whether to harvest fruit, described with reference to FIG. 17, may be basically applied to the determination system on whether to harvest fruit, so redundant descriptions will be omitted.

The obtaining S1310 of the at least one piece of information among season information, demand prediction information, weather prediction information, and distribution network-related information, according to one embodiment, may be implemented in at least one server, but is not limited thereto.

In addition, the obtaining S1310 of the at least one piece of information among season information, demand prediction information, weather prediction information, and distribution network-related information, according to one embodiment, may be obtained from at least one server, but is not limited thereto.

In addition, the season information, according to one embodiment, may include classification information on seasons, temperature information on seasons, humidity information on seasons, and the like, but is not limited thereto.

In addition, the weather prediction information, according to one embodiment, may include temperature information, humidity information, weather information, and the like, but is not limited thereto.

In addition, the distribution network-related information, according to one embodiment, may include information on distribution period, information on distribution network length, information on distribution season, and the like, but is not limited thereto.

In addition, the setting S1320 of the reference for determining fruit harvest on the basis of the obtained information, according to one embodiment, may be implemented in at least one server, but is not limited thereto.

In addition, the setting S1320 of the reference for determining fruit harvest on the basis of the obtained information, according to one embodiment, may be implemented in the harvesting device according to one embodiment, but is not limited thereto.

In addition, in the setting S1320 of the reference for determining fruit harvest on the basis of the obtained information, according to one embodiment, the reference for determining fruit harvest may include a reference value for the result data described above, a reference value for the evaluation index described above, and the like, but is not limited thereto.

In addition, the determining S1330 of whether to harvest fruit according to the reference for determining fruit harvest, according to one embodiment, may be implemented in at least one server, but is not limited thereto.

In addition, the determining S1330 of whether to harvest fruit according to the reference for determining fruit harvest, according to one embodiment, may be implemented in the harvesting device according to one embodiment, but is not limited thereto.

Figure 22:
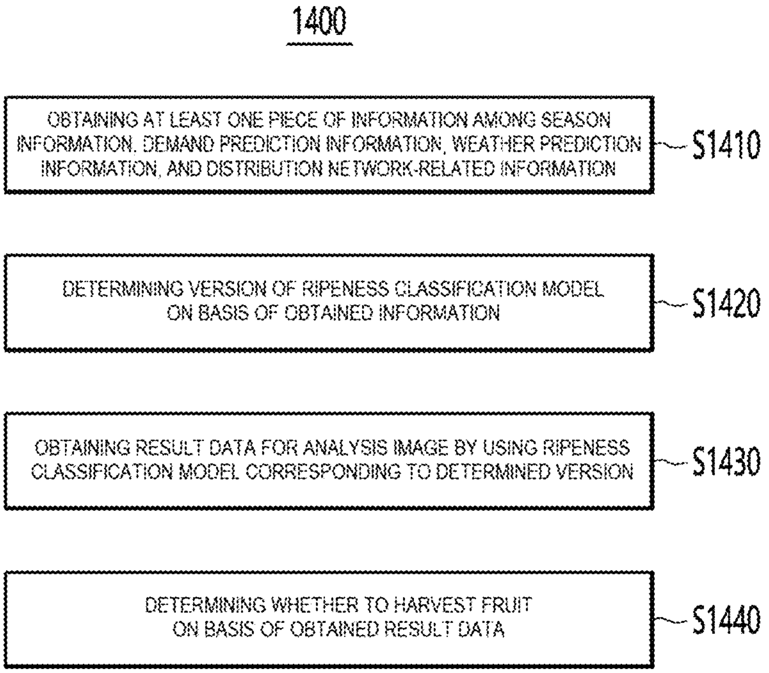
FIG. 22 is a flowchart for describing a method of operating a determination system of whether to harvest fruit according to one embodiment.

FIG. 22 is a flowchart for describing a method of operating the determination system of whether to harvest fruit according to one embodiment.

Referring to FIG. 22, a method 1400 of operating the determination system on whether to harvest fruit, according to one embodiment, may include at least one among: S1410 of obtaining at least one piece of information among season information, demand prediction information, weather prediction information, and distribution network-related information, S1420 of determining a version of a ripeness classification model on the basis of the obtained information, S1430 of obtaining result data for an analysis image by using the ripeness classification model corresponding to the determined version, and S1440 of determining whether to harvest fruit on the basis of the obtained result data.

In addition, the content of the determination system whether to harvest fruit, described with reference to FIG. 17, may be basically applied to the determination system whether to harvest fruit, so redundant descriptions will be omitted.

The content described above may be applied to the obtaining S1410 of the at least one piece of information among season information, demand prediction information, weather prediction information, and distribution network-related information, according to one embodiment, so redundant descriptions will be omitted.

In addition, the determining S1420 of the version of the ripeness classification model on the basis of the obtained information, according to one embodiment, may be implemented in at least one server, but is not limited thereto.

In addition, the determining S1420 of the version of the ripeness classification model on the basis of the obtained information, according to one embodiment, may be implemented in the harvesting device according to one embodiment, but is not limited thereto.

In addition, the content described above may be applied to the version of the ripeness classification model in the determining S1420 of the version of the ripeness classification model on the basis of the obtained information, according to one embodiment, so redundant descriptions will be omitted.

In addition, the determining S1420 of the version of the ripeness classification model on the basis of the obtained information, according to one embodiment, may include determining the version of the ripeness classification model on the basis of the season information.

For example, when the season information obtained according to one embodiment is information for a first season, a first-version ripeness classification model may be determined as the ripeness classification model. In addition, when the obtained season information is information for a second season, a second-version ripeness classification model may be determined as the ripeness classification model. However, the ripeness classification model is not limited thereto.

In addition, the determining S1420 of the version of the ripeness classification model on the basis of the obtained information, according to one embodiment, may include determining the version of the ripeness classification model on the basis of the demand prediction information.

For example, when the demand prediction information obtained according to one embodiment falls within a first range, the first-version ripeness classification model may be determined as the ripeness classification model. In addition, when the obtained demand prediction information falls within a second range, the second-version ripeness classification model may be determined as the ripeness classification model. However, the ripeness classification model is not limited thereto.

In addition, the determining S1420 of the version of the ripeness classification model on the basis of the obtained information, according to one embodiment, may include determining the version of the ripeness classification model on the basis of the weather prediction information.

For example, when a temperature included in the weather information obtained according to one embodiment falls within a first range, the first-version ripeness classification model may be determined as the ripeness classification model. In addition, when the obtained temperature falls within a second range, the second-version ripeness classification model may be determined as the ripeness classification model. However, the ripeness classification model is not limited thereto.

In addition, the determining S1420 of the version of the ripeness classification model on the basis of the obtained information, according to one embodiment, may include determining the version of the ripeness classification model on the basis of the distribution network-related information.

For example, when a distribution period included in the distribution network-related information obtained according to one embodiment falls within a first range, the first-version ripeness classification model may be determined as the ripeness classification model. In addition, when the obtained distribution period falls within a second range, the second-version ripeness classification model may be determined as the ripeness classification model. However, the ripeness classification model is not limited thereto.

In addition, the obtaining S1430 of the result data for the analysis image by using the ripeness classification model corresponding to the determined version may be implemented in at least one server, but is not limited thereto.

In addition, the obtaining S1430 of the result data for the analysis image by using the ripeness classification model corresponding to the determined version may be implemented in the harvesting device according to one embodiment, but is not limited thereto.

In addition, the content of the analysis and prediction system and the like, described above, may be applied to the obtaining S1430 of the result data for the analysis image by using the ripeness classification model corresponding to the determined version, so redundant descriptions will be omitted.

In addition, the determining S1440 of whether to harvest fruit on the basis of the obtained result data may be implemented in at least one server, but is not limited thereto.

In addition, the determining S1440 of whether to harvest fruit on the basis of the obtained result data may be implemented in the harvesting device according to one embodiment, but is not limited thereto.

In addition, the content of the determination system on whether to harvest fruit, described above, may be applied to the determining S1440 of whether to harvest fruit on the basis of the obtained result data, so redundant descriptions will be omitted.

In the above, although the configurations and features of the present disclosure have been described based on the embodiments according to the present disclosure, the present disclosure is not limited thereto. Those skilled in the art will clearly appreciate that various modifications and changes are possible, without departing from the scope and spirit of the present disclosure, and thus such modifications and changes are intended to fall within the scope of the appended claims.

Mode for Invention

As described above, related descriptions have been described in Best Mode.

The invention claimed is:

1. A harvesting robot, comprising:

a transport module configured to move along a rail located between crops in a greenhouse;

an image capture module configured to capture a plurality of images reflecting at least a part of the crops;

a harvesting module configured to harvest fruits located on at least one of the crops;

a memory configured to store a trained ripeness determination model and at least two of predetermined ripeness threshold values, wherein the trained ripeness determination model is trained using training data set, wherein the training data set includes a fruit image and a label data corresponding to the fruit image, and wherein the at least two of predetermined ripeness threshold values include a first ripeness threshold value corresponding to a first season and a second ripeness threshold value corresponding to a second season; and a processor configured to control the harvesting module, wherein the processor is configured to:

obtain a temperature information indicating an average daily temperature outside the greenhouse, determine a season information based on at least the temperature information, wherein the season information is determined as the first season or the second season, determine a ripeness threshold value based on at least the season information, wherein the ripeness threshold value is determined as the first ripeness threshold value when the season information is determined as the first season, wherein the ripeness threshold value is determined as the second ripeness threshold value when the season information is determined as the second season, obtain a first fruit image reflecting a first fruit, obtain a first ripeness score for the first fruit by applying the first fruit image to the trained ripeness determination model, and control the harvesting module so that the harvesting module harvests the first fruit when the first ripeness score is greater than the determined ripeness threshold value, wherein the first season corresponds to a season with a higher average season temperature than the second season, and wherein the first ripeness threshold value is less than the second ripeness threshold value.

2. The harvesting robot of claim 1, wherein the first season is summer season and the second season is winter season.

3. The harvesting robot of claim 1, wherein the memory is further configured to store at least two of predetermined period information, wherein the at least two of predetermined period information include a first period corresponding to the first season and a second period corresponding to the second season, and wherein the processor is further configured to:

obtain a current day information, determine a period determination result indicating whether the current day information is included in the first period or the second period, and determine the season information based on the temperature information and the period determination result.

4. The harvesting robot of claim 3, wherein the first period and the second period include a period of at least one month or more.

5. The harvesting robot of claim 1, wherein the memory is further configured to store at least two of reference temperature information, wherein the at least two of reference temperature information include a first reference temperature information corresponding to the first season and a second reference temperature information corresponding to the second season, and wherein the determination of the season information comprises:

comparing the temperature information with the first reference temperature information and the second reference temperature information, determining the season information as the first season when a difference between the temperature information and the first reference temperature information is within a predetermined range, and determining the season information as the second season when a difference between the temperature information and the second reference temperature information is within a predetermined range.

6. The harvesting robot of claim 1, wherein when the first ripeness score indicates a value between the first ripeness threshold value and the second ripeness threshold value the first fruit is harvested if it is determined that the season information is the first season and the first fruit is not harvested if it is determined that the season information is the second season.

7. A method for controlling a harvesting robot, comprising:

obtaining a temperature information indicating an average daily temperature outside a greenhouse;

determining a season information based on at least the temperature information, wherein the season information is determined as a first season or a second season;

determining a ripeness threshold value based on at least the season information, wherein the ripeness threshold value is determined as a first ripeness threshold value when the season information is determined as the first season, wherein the ripeness threshold value is determined as a second ripeness threshold value when the season information is determined as the second season;

obtaining a first fruit image reflecting a first fruit;

obtaining a first ripeness score for the first fruit by applying the first fruit image to a trained ripeness determination model; and controlling the harvesting robot so that the harvesting robot harvests the first fruit when the first ripeness score is greater than the determined ripeness threshold value, wherein when the first season corresponds to a season with a higher average season temperature than the second season, the first ripeness threshold value is less than the second ripeness threshold value.

8. The method of claim 7, wherein the first season is summer season and the second season is winter season.

9. The method of claim 7, wherein the method further comprises:

obtaining a current day information, determining a period determination result indicating whether the current day information is included in a first period or a second period, and determining the season information based on the temperature information and the period determination result.

10. The method of claim 9, wherein the first period and the second period include a period of at least one month or more.

11. The method of claim 7, wherein the determination of the season information comprises:

comparing the temperature information with a first reference temperature information and a second reference temperature information, determining the season information as the first season when a difference between the temperature information and the first reference temperature information is within a predetermined range, and determining the season information as the second season when a difference between the temperature information and the second reference temperature information is within a predetermined range.

12. The method of claim 7, wherein when the first ripeness score indicates a value between the first ripeness threshold value and the second ripeness threshold value the first fruit is harvested if it is determined that the season information is the first season and the first fruit is not harvested if it is determined that the season information is the second season.

* * * * *